US012568538B2

(12) United States Patent
Hwang et al.

(10) Patent No.: US 12,568,538 B2
(45) Date of Patent: Mar. 3, 2026

(54) METHOD AND DEVICE FOR DIRECT COMMUNICATION IN WIRELESS LAN

(71) Applicants: ELECTRONICS AND TELECOMMUNICATIONS RESEARCH INSTITUTE, Daejeon (KR); KOREA NATIONAL UNIVERSITY OF TRANSPORTATION INDUSTRY-ACADEMIC COOPERATION FOUNDATION, Chungju-si (KR)

(72) Inventors: Sung Hyun Hwang, Daejeon (KR); Kyu Min Kang, Daejeon (KR); Jae Cheol Park, Daejeon (KR); Jin Hyung Oh, Daejeon (KR); Dong Woo Lim, Daejeon (KR); Su Na Choi, Daejeon (KR); Yong Ho Kim, Incheon (KR)

(73) Assignees: Electronics and Telecommunications Research Institute, Daejeon (KR); Korea National University of Transportation Industry-Academic Cooperation Foundation, Chungju-si (KR)

( * ) Notice: Subject to any disclaimer, the term of this patent is extended or adjusted under 35 U.S.C. 154(b) by 513 days.

(21) Appl. No.: 17/916,893

(22) PCT Filed: Apr. 12, 2021

(86) PCT No.: PCT/KR2021/004593
§ 371 (c)(1),
(2) Date: Oct. 4, 2022

(87) PCT Pub. No.: WO2021/210869
PCT Pub. Date: Oct. 21, 2021

(65) Prior Publication Data
US 2023/0164857 A1 May 25, 2023

(30) Foreign Application Priority Data

Apr. 13, 2020    (KR) ........................ 10-2020-0044697

(51) Int. Cl.
*H04W 4/00* (2018.01)
*H04W 74/08* (2009.01)
(Continued)

(52) U.S. Cl.
CPC ....... *H04W 76/14* (2018.02); *H04W 74/0816* (2013.01); *H04W 74/0866* (2013.01); *H04W 84/12* (2013.01)

(58) Field of Classification Search
CPC ............. H04W 76/14; H04W 74/0816; H04W 74/0866; H04W 84/12
See application file for complete search history.

(56) References Cited

U.S. PATENT DOCUMENTS 8,712,418 B2 * 4/2014 Morioka ................ H04B 7/024
                                                        455/445
8,767,692 B2    7/2014 Kim et al.
                        (Continued)

FOREIGN PATENT DOCUMENTS

KR    10-2005-0068741 A    7/2005
KR    10-2010-0096210 A    9/2010
                (Continued)

*Primary Examiner* — Abdelnabi O Musa
(74) *Attorney, Agent, or Firm* — Rabin & Berdo, P.C.

(57) ABSTRACT

Disclosed are a method and device for direct communication in a wireless LAN. An operation method of a first device comprises the steps of: transmitting a first frame, which is for setting up a direct communication link, to a second device over one or more links among multiple links; receiving a second frame, which is a response to the first frame, from the second device over the one or more links; and
(Continued)

100 directly communicating with one or more peer devices over the direct communication link when the second frame is received.

13 Claims, 16 Drawing Sheets

(51) Int. Cl.
| | | |
|---|---|---|
| *H04W 74/0816* | (2024.01) | |
| *H04W 76/14* | (2018.01) | |
| *H04W 84/12* | (2009.01) | |

(56) References Cited

U.S. PATENT DOCUMENTS

| | | | | |
|---|---|---|---|---|
| 8,842,624 | B2 | 9/2014 | Trachewsky | |
| 9,622,218 | B2 | 4/2017 | Lee et al. | |
| 10,701,686 | B1 * | 6/2020 | Kwon | H04L 5/0044 |
| 2007/0104138 | A1 | 5/2007 | Rudolf et al. | |
| 2008/0311852 | A1 * | 12/2008 | Hansen | H04W 88/06 |
| | | | | 455/41.2 |
| 2009/0005057 | A1 * | 1/2009 | Lee | H04W 72/0446 |
| | | | | 455/450 |
| 2009/0138603 | A1 * | 5/2009 | Surineni | H04W 72/04 |
| | | | | 709/227 |
| 2010/0014463 | A1 * | 1/2010 | Nagai | H04W 72/27 |
| | | | | 370/328 |
| 2011/0317630 | A1 * | 12/2011 | Zhu | H04W 74/0816 |
| | | | | 370/329 |
| 2012/0087358 | A1 * | 4/2012 | Zhu | H04W 74/0816 |
| | | | | 370/338 |

| | | | | |
|---|---|---|---|---|
| 2012/0120892 | A1 | 5/2012 | Freda et al. | |
| 2012/0188981 | A1 * | 7/2012 | Chang | H04W 76/14 |
| | | | | 370/329 |
| 2012/0224546 | A1 * | 9/2012 | Chang | H04W 76/14 |
| | | | | 370/329 |
| 2012/0294245 | A1 * | 11/2012 | Chang | H04W 56/002 |
| | | | | 370/337 |
| 2013/0294322 | A1 * | 11/2013 | Yun | H04W 76/14 |
| | | | | 370/312 |
| 2014/0071917 | A1 * | 3/2014 | Kim | H04L 5/0094 |
| | | | | 370/329 |
| 2014/0376463 | A1 | 12/2014 | Kim et al. | |
| 2015/0327292 | A1 | 11/2015 | Morioka | |
| 2016/0330732 | A1 * | 11/2016 | Moon | H04B 7/0639 |
| 2016/0380727 | A1 * | 12/2016 | Ryu | H04L 1/18 |
| | | | | 370/245 |
| 2017/0163737 | A1 | 6/2017 | Cordeiro et al. | |
| 2017/0257888 | A1 * | 9/2017 | Kneckt | H04W 74/0816 |
| 2017/0264416 | A1 * | 9/2017 | Wilhelmsson | H04W 72/23 |
| 2017/0347374 | A1 | 11/2017 | Mahajan et al. | |
| 2018/0020476 | A1 * | 1/2018 | Aijaz | H04W 8/005 |
| 2018/0103396 | A1 * | 4/2018 | Kasher | H04L 5/00 |
| 2018/0213558 | A1 * | 7/2018 | Kim | H04W 74/08 |
| 2018/0219644 | A1 * | 8/2018 | Ahn | H04W 74/006 |
| 2018/0235004 | A1 * | 8/2018 | Cheong | H04W 74/085 |
| 2022/0123881 | A1 * | 4/2022 | Li | H04L 5/0035 |

FOREIGN PATENT DOCUMENTS

| | | | |
|---|---|---|---|
| KR | 10-1006115 | B1 | 1/2011 |
| KR | 10-2014-0147662 | A | 12/2014 |
| KR | 10-2017-0026658 | A | 3/2017 |
| KR | 10-2018-0019760 | A | 2/2018 |

* cited by examiner

FIG. 6

FIG. 8 first link

Figure 8:
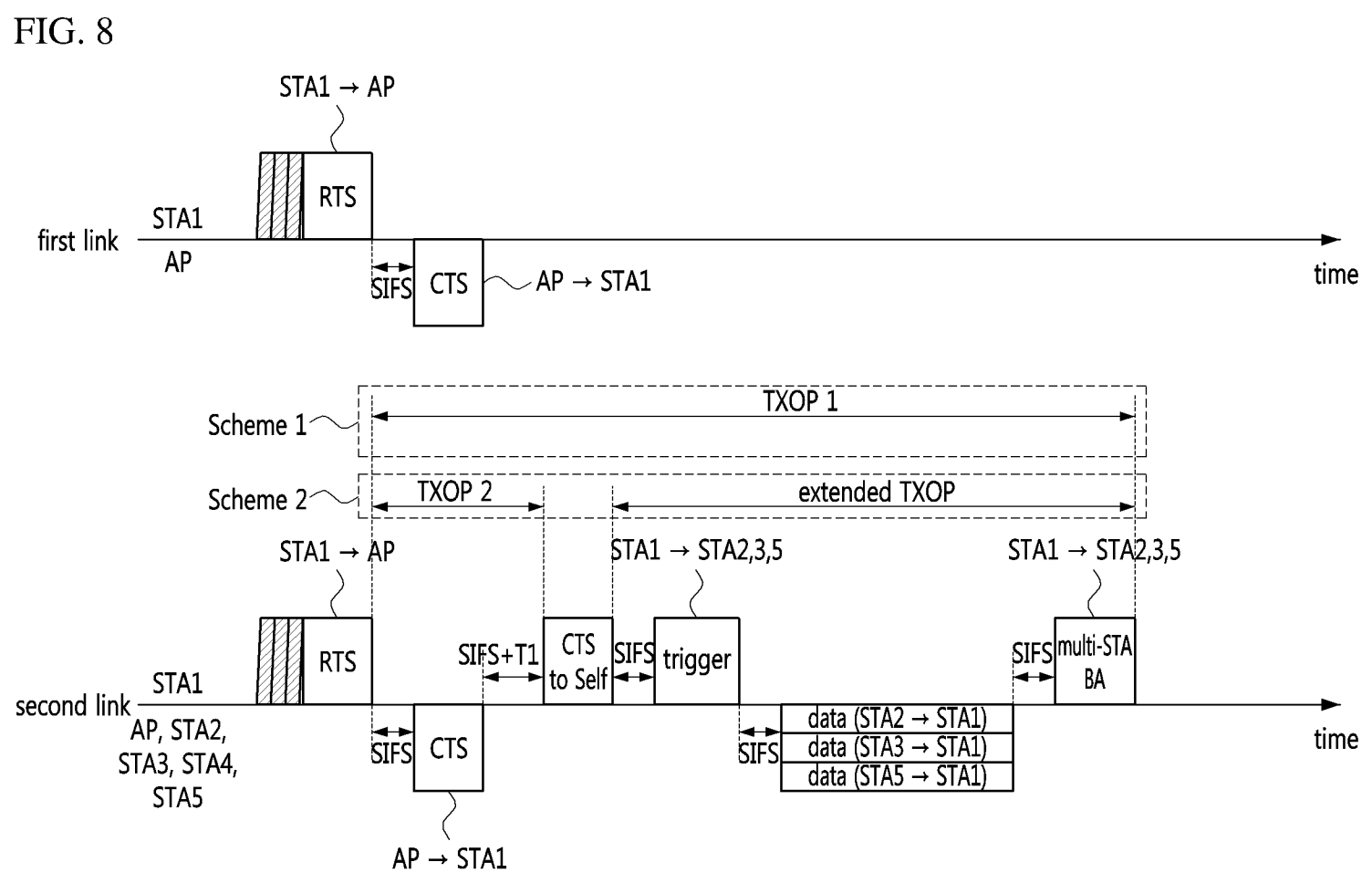

STA1
AP

STA1 → AP

RTS

SIFS

CTS

AP → STA1

TXOP 1 extended TXOP

Scheme 1

Scheme 2

TXOP 2 second link

STA1
AP, STA2,
STA3, STA4,
STA5

STA1 → AP

RTS

SIFS

CTS

AP → STA1

SIFS+T1

CTS to Self

SIFS

STA1 → STA2,3,5 trigger

SIFS data (STA2 → STA1)
data (STA3 → STA1)
data (STA5 → STA1)

SIFS

STA1 → STA2,3,5 multi-STA BA time time

METHOD AND DEVICE FOR DIRECT COMMUNICATION IN WIRELESS LAN

TECHNICAL FIELD

The present disclosure relates to a wireless local area network (LAN) communication technique, and more particularly, to a direct communication technique in a wireless LAN.

BACKGROUND ART

Recently, as the spread of mobile devices expands, a wireless local area network technology capable of providing fast wireless communication services to mobile devices is in the spotlight. The wireless LAN technology may be a technology that supports mobile devices such as smart phones, smart pads, laptop computers, portable multimedia players, embedded devices, and the like to wirelessly access the Internet based on wireless communication technology.

The standards using the wireless LAN technology are being standardized as IEEE802.11 standards mainly in the Institute of Electrical and Electronics Engineers (IEEE). The initial version of the IEEE 802.11 standard can support a communication speed of 1 to 2 megabits per second (Mbps). The later versions of the IEEE 802.11 standard are being standardized in the direction of improving the communication speed.

The revised version of the IEEE 802.11a standard can support a communication speed of up to 54 Mbps using an orthogonal frequency division multiplexing (OFDM) scheme in a 5 giga hertz (GHz) band. The IEEE 802.11b standard utilizes a direct sequence spread spectrum (DSSS) scheme to support a communication speed of up to 11 Mbps in a 2.4 GHz band where the initial version operates.

The IEEE 802.11n standard supporting a high throughput (HT) wireless LAN technology has been developed due to the demand for higher speed. The IEEE 802.11n standard may support the OFDM scheme. By supporting channel bandwidth expansion techniques and multiple input multiple output (MIMO) techniques in the IEEE 802.11n standard, the maximum communication speeds in the 2.4 GHz band and the 5 GHz band can be improved. For example, the IEEE 802.11n standard can support a communication speed of up to 600 Mbps by using 4 spatial streams and a 40 MHz bandwidth.

As the above-described wireless LAN technologies have been developed and spread, applications using the wireless LAN technologies have been diversified, and a demand for a wireless LAN technology supporting a higher throughput has arisen. Accordingly, a frequency bandwidth (e.g., 'maximum 160 MHz bandwidth' or '80+80 MHz bandwidth') used in the IEEE 802.11ac standard has been expanded, and the number of supported spatial streams has also increased. The IEEE 802.11ac standard may be a very high throughput (VHT) wireless LAN technology supporting a high throughput of 1 gigabit per second (Gbps) or more. The IEEE 802.11ac standard can support downlink transmission for multiple stations by utilizing the MIMO techniques.

As the demand for wireless LAN technologies further increases, the IEEE 802.11ax standard has been developed to increase a frequency efficiency in a dense environment. In the IEEE 802.11ax standard, a communication procedure may be performed using multi-user (MU) orthogonal frequency division multiple access (OFDMA) techniques. In the IEEE 802.11ax standard, uplink communication may be performed using the MU MIMO techniques and/or OFDMA techniques.

As applications requiring higher throughput and applications requiring real-time transmission occur, the IEEE 802.11be standard, which is an extreme high throughput (EHT) wireless LAN technology, is being developed. The goal of the IEEE 802.11be standard may be to support a high throughput of 30 Gbps. The IEEE 802.11be standard may support techniques for reducing a transmission latency. In addition, the IEEE 802.11be standard can support a more expanded frequency bandwidth (e.g., 320 MHz bandwidth), multi-link transmission and aggregation operations including multi-band operations, multiple access point (AP) transmission operations, and/or efficient retransmission operations (e.g., hybrid automatic repeat request (HARQ) operations).

However, since the multi-link operation is an operation that is not defined in the existing WLAN standard, it may be necessary to define detailed operations according to the environment in which the multi-link operation is performed. In particular, when two or more bands performing the multi-link operation are close to each other, simultaneous transmission and reception operations through a multi-link may not be performed within one device due to signal interference between adjacent channels (e.g., adjacent links). In particular, when a signal interference level between the adjacent channels is equal to or greater than a specific level, a channel access operation (e.g., backoff operation) for transmission in another link may not be performed due to the interference while performing a transmission operation in one link. Therefore, a method for multi-link operations in the above-described situations may be required.

Meanwhile, the technologies that are the background of the present disclosure are written to improve the understanding of the background of the present disclosure and may include content that is not already known to those of ordinary skill in the art to which the present disclosure belongs.

DISCLOSURE

Technical Problem

The present disclosure is directed to providing a method and an apparatus for direct communications in a wireless LAN system.

Technical Solution

An operation method of a first device, according to a first exemplary embodiment of the present disclosure for achieving the above-described objective, may comprise: transmitting, to a second device, a first frame for configuring a direct communication link in one or more links of the multi-link; receiving, from the second device, a second frame that is a response to the first frame in the one or more links; and in response to receiving the second frame, performing direct communication with one or more peer devices in the direct communication link.

The performing of the direct communication may comprise: transmitting a third frame to discover the one or more peer devices in the direct communication link; receiving, from the one or more peer devices, a fourth frame in response to the third frame in the direct communication link;

and transmitting or receiving data frame(s) to or from the one or more peer devices in the direct communication link.

The operation method may further comprise transmitting, to the one or more peer devices, a fifth frame including resource allocation information in the direct communication link, wherein the data frame(s) is transmitted or received using resource(s) indicated by the resource allocation information.

The data frame(s) may be transmitted or received in an Orthogonal Frequency Division Multiple Access (OFDMA) scheme.

The first frame may include information indicating the direct communication link, wherein the direct communication link is one of the one or more links.

The information indicating the direct communication link may be a medium access control (MAC) address of the second device in the direct communication link.

The first frame may be a request-to-send (RTS) frame or a multi user (MU) RTS frame, and the second frame may be a clear-to-send (CTS) frame or a simultaneous(S)-CTS frame.

The second frame may be received from the second device when the direct communication is allowed.

Information indicating a direct communication period in which the direct communication is performed may be included in the first frame or the second frame.

An operation method of a first station, according to a second exemplary embodiment of the present disclosure for achieving the above-described objective, may comprise: receiving, from a second station affiliated with a second MLD, a first frame in a first link, the first frame including information indicating that direct communication is performed in the first link; transmitting, to the second station, a second frame indicating participation in the direct communication in the first link; and transmitting or receiving a data frame to and from the second station in the first link.

The operation method may further comprise receiving, from the second station, a third frame including resource allocation information in the first link, wherein the data frame is transmitted or received using a resource indicated by the resource allocation information.

The operation method may further comprise performing an association procedure with the second station when the first station is not associated with an access point, wherein the data frame is transmitted or received when the association procedure is completed.

The direct communication between the first station and the second station may be performed within a direct communication period negotiated between the first station and an access point.

The first frame may be a request-to-send (RTS) frame or a multi user (MU) RTS frame, and the second frame may be a clear-to-send (CTS) frame or a simultaneous(S)-CTS frame.

A first device according to a third exemplary embodiment of the present disclosure for achieving the above-described objective may comprise: a processor; a memory electronically communicating with the processor; and instructions stored in the memory, wherein when executed by the processor, the instructions cause the first device to: transmit, to a second device, a first frame for configuring a direct communication link in one or more links of the multi-link; receive, from the second device, a second frame that is a response to the first frame in the one or more links; and in response to receiving the second frame, perform direct communication with one or more peer devices in the direct communication link.

In the performing of the direct communication, the instructions may further cause the first device to: transmit a third frame to discover the one or more peer devices in the direct communication link; receive, from the one or more peer devices, a fourth frame in response to the third frame in the direct communication link; and transmit or receive data frame(s) to or from the one or more peer devices in the direct communication link.

The instructions may further cause the first device to transmit, to the one or more peer devices, a fifth frame including resource allocation information in the direct communication link, wherein the data frame(s) is transmitted or received using resource(s) indicated by the resource allocation information.

The first frame may include information indicating the direct communication link, wherein the direct communication link is one of the one or more links.

The information indicating the direct communication link may be a medium access control (MAC) address of the second device in the direct communication link.

Information indicating a direct communication period in which the direct communication is performed may be included in the first frame or the second frame.

Advantageous Effects

According to the present disclosure, stations can directly communicate without going through an access point. A direct communication operation may be negotiated between the station(s) and an access point. The access point may configure a direct communication period, and the stations may perform direct communications within the direct communication period. Therefore, communication efficiency in the wireless LAN can be improved.

DESCRIPTION OF DRAWINGS

FIG. 6 is a conceptual diagram illustrating a first exemplary embodiment of a direct communication method in a wireless LAN system.

FIG. 8 is a conceptual diagram illustrating a third exemplary embodiment of a direct communication method in a wireless LAN system.

FIG. 9A is a conceptual diagram illustrating a fourth exemplary embodiment of a direct communication method in a wireless LAN system.

FIG. 9B is a conceptual diagram illustrating a fifth exemplary embodiment of a direct communication method in a wireless LAN system.

FIG. 12 is a conceptual diagram illustrating a tenth exemplary embodiment of a direct communication method in a wireless LAN system.

MODE OF THE INVENTION

Figure 1:
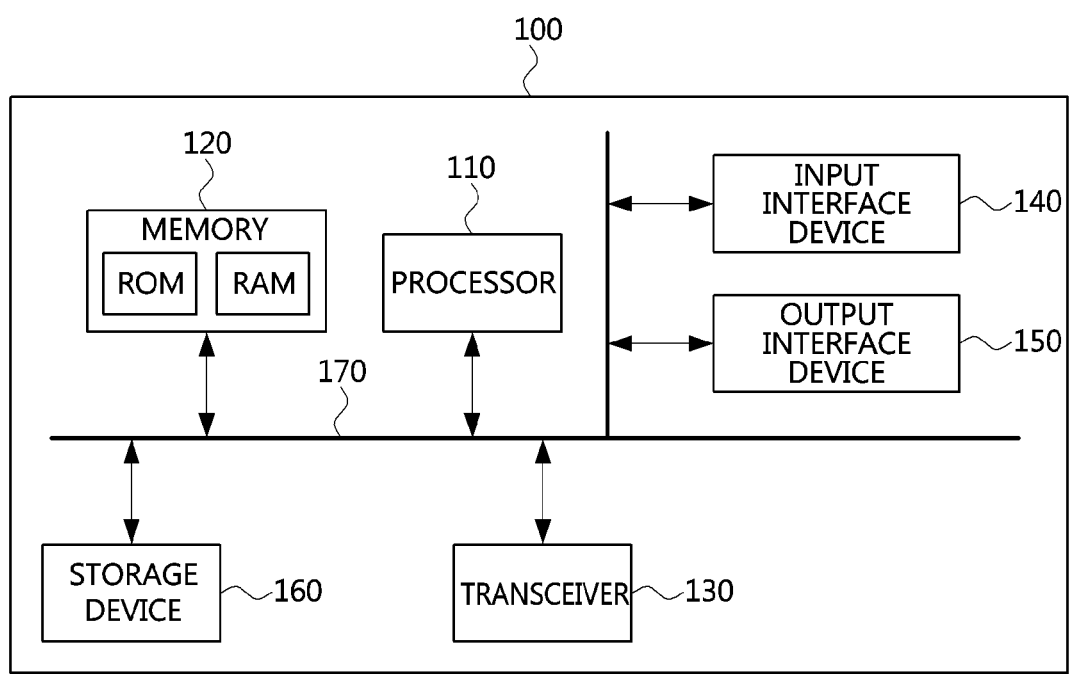
FIG. 1 is a block diagram illustrating a first exemplary embodiment of a communication node constituting a wireless LAN system.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

In the following, a wireless communication system to which exemplary embodiments according to the present disclosure are applied will be described. The wireless communication system to which the exemplary embodiments according to the present disclosure are applied is not limited to the contents described below, and the exemplary embodiments according to the present disclosure can be applied to various wireless communication systems. A wireless communication system may be referred to as a 'wireless communication network'.

FIG. 1 is a block diagram illustrating a first exemplary embodiment of a communication node constituting a wireless LAN system.

As shown in FIG. 1, a communication node 100 may be an access point, a station, an access point (AP) multi-link device (MLD), or a non-AP MLD. The access point may refer to an AP, and the station may refer to a STA or a non-AP STA. The operating channel width supported by the access point may be 20 megahertz (MHz), 80 MHz, 160 MHz, or the like. The operating channel width supported by the station may be 20 MHz, 80 MHz, or the like.

The communication node 100 may include at least one processor 110, a memory 120, and a plurality of transceivers 130 connected to a network to perform communications. The transceiver 130 may be referred to as a transceiver, a radio frequency (RF) unit, an RF module, or the like. In addition, the communication node 100 may further include an input interface device 140, an output interface device 150, a storage device 160, and the like. The components included in the communication node 100 may be connected by a bus 170 to communicate with each other.

However, the respective components included in the communication node 100 may be connected through individual interfaces or individual buses centering on the processor 110 instead of the common bus 170. For example, the processor 110 may be connected to at least one of the memory 120, the transceiver 130, the input interface device 140, the output interface device 150, and the storage device 160 through a dedicated interface.

The processor 110 may execute at least one instruction stored in at least one of the memory 120 and the storage device 160. The processor 110 may refer to a central processing unit (CPU), a graphics processing unit (GPU), or a dedicated processor on which the methods according to the exemplary embodiments of the present invention are performed. Each of the memory 120 and the storage device 160 may be configured as at least one of a volatile storage medium and a nonvolatile storage medium. For example, the memory 120 may be configured with at least one of a read only memory (ROM) and a random access memory (RAM).

Figure 2:
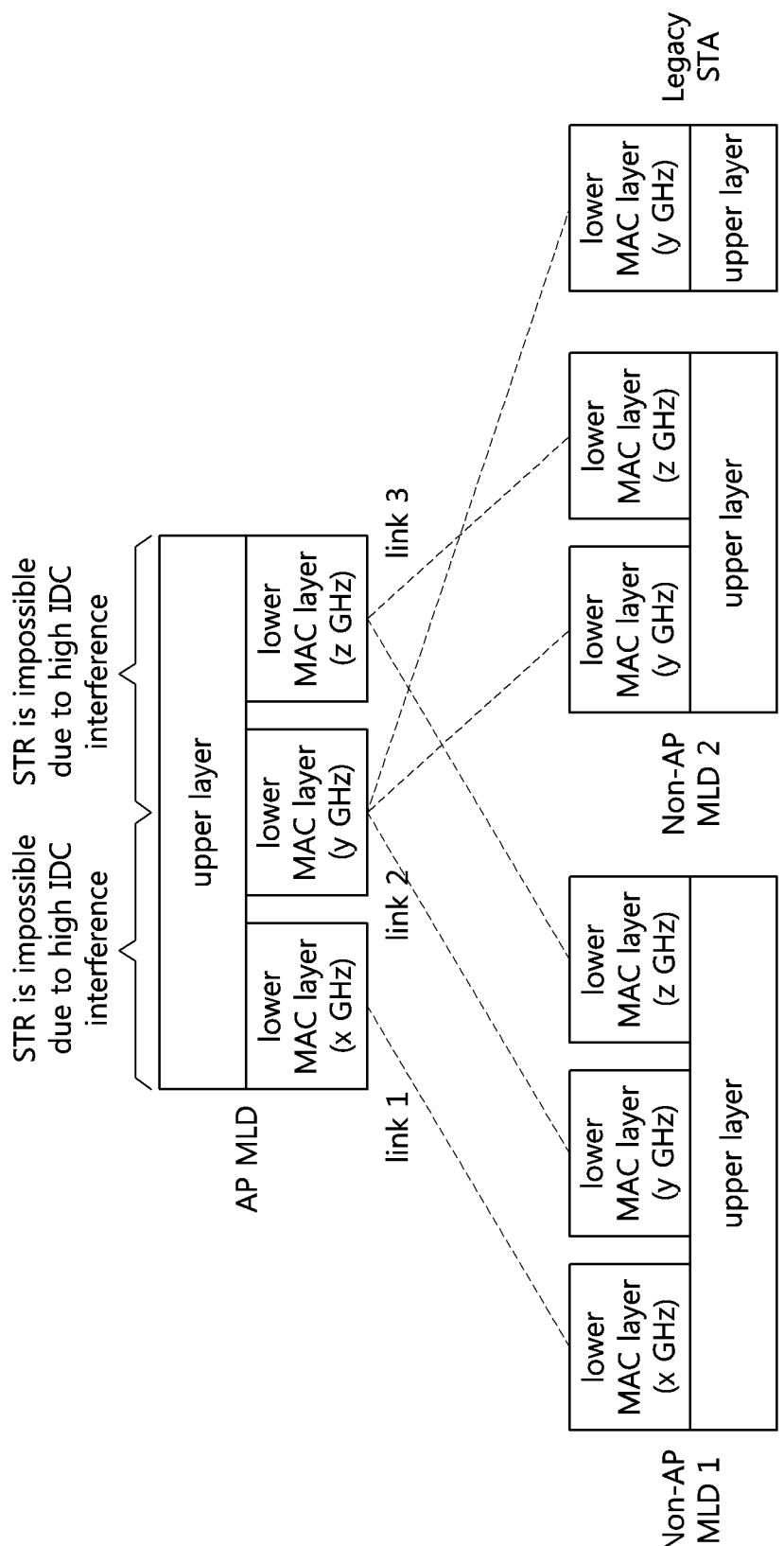
FIG. 2 is a conceptual diagram illustrating a first exemplary embodiment of multi-links configured between MLDs.

FIG. 2 is a conceptual diagram illustrating a first exemplary embodiment of multi-links configured between MLDs.

As shown in FIG. 2, an MLD may have one medium access control (MAC) address. In exemplary embodiments, the MLD may mean an AP MLD and/or non-AP MLD. The MAC address of the MLD may be used in a multi-link setup procedure between the non-AP MLD and the AP MLD. The MAC address of the AP MLD may be different from the MAC address of the non-AP MLD. AP(s) affiliated with the AP MLD may have different MAC addresses, and station(s) (STA(s)) affiliated with the non-AP MLD may have different MAC addresses. Each of the APs having different MAC addresses may be in charge of each link among multiple links supported by the AP MLD, and may perform a role of an independent AP.

Each of the STAs having different MAC addresses may be in charge of each link among multiple links supported by the non-AP MLD, and may perform a role of an independent STA. The non-AP MLD may be referred to as a STA MLD. The MLD may support a simultaneous transmit and receive (STR) operation. In this case, the MLD may perform a transmission operation in a link 1 and may perform a reception operation in a link 2. The MLD supporting the STR operation may be referred to as an STR MLD (e.g., STR AP MLD, STR non-AP MLD). In exemplary embodiments, a link may mean a channel or a band. A device that does not support the STR operation may be referred to as a non-STR (NSTR) AP MLD or an NSTR non-AP MLD (or NSTR STA MLD).

The MLD may transmit and receive frames in multiple links (i.e., multi-link) by using a non-contiguous bandwidth extension scheme (e.g., 80 MHz+80 MHz). The multi-link operation may include multi-band transmission. The AP MLD may include a plurality of APs, and the plurality of APs may operate in different links. Each of the plurality of APs may perform function(s) of a lower MAC layer. Each of the plurality of APs may be referred to as a 'communication node' or 'lower entity'. The communication node (i.e., AP) may operate under control of an upper layer (or the processor 110 shown in FIG. 1). The non-AP MLD may include a plurality of STAs, and the plurality of STAs may operate in different links. Each of the plurality of STAs may be referred to as a 'communication node' or 'lower entity'. The communication node (i.e., STA) may operate under control of an upper layer (or the processor 110 shown in FIG. 1).

The MLD may perform communications in multiple bands (i.e., multi-band). For example, the MLD may perform communications using an 40 MHz bandwidth according to a channel expansion scheme (e.g., bandwidth expansion scheme) in a 2.4 GHz band, and perform communications using a 160 MHz bandwidth according to a channel expansion scheme in a 5 GHz band. The MLD may perform communications using a 160 MHz bandwidth in the 5 GHz band, and may perform communications using a 160 MHz bandwidth in a 6 GHz band. One frequency band (e.g., one channel) used by the MLD may be defined as one link. Alternatively, a plurality of links may be configured in one frequency band used by the MLD. For example, the MLD may configure one link in the 2.4 GHz band and two links in the 6 GHz band. The respective links may be referred to as a first link, a second link, and a third link.

The MLD (e.g., AP MLD and/or non-AP MLD) may configure a multi-link by performing an access procedure and/or a negotiation procedure for a multi-link operation. In this case, the number of links and/or link(s) to be used in the multi-link may be configured. The non-AP MLD (e.g., STA) may identify information on band(s) capable of communicating with the AP MLD. In the negotiation procedure for a multi-link operation between the non-AP MLD and the AP MLD, the non-AP MLD may configure one or more links among links supported by the AP MLD to be used for the multi-link operation. A station that does not support a multi-link operation (e.g., IEEE 802.11a/b/g/n/ac/ax STA) may be connected to one or more links of the multi-link supported by the AP MLD.

When a band separation between multiple links (e.g., a band separation between the link 1 and the link 2 in the frequency domain) is sufficient, the MLD may perform an STR operation. For example, the MLD may transmit a physical layer convergence procedure (PLCP) protocol data unit (PPDU) 1 using the link 1 among multiple links, and may receive a PPDU 2 using the link 2 among multiple links. On the other hand, if the MLD performs the STR operation when the band separation between multiple links is insufficient, in-device coexistence (IDC) interference, which is interference between the multiple links, may occur. Therefore, when the band separation between multiple links is not sufficient, the MLD may not be able to perform the STR operation.

For example, a multi-link including a link 1, a link 2, and a link 3 may be configured between the AP MLD and the non-AP MLD 1. If the band separation between the link 1 and the link 3 is sufficient, the AP MLD may perform an STR operation using the link 1 and the link 3. That is, the AP MLD may transmit a frame using the link 1 and may receive a frame using the link 3. If the band separation between the link 1 and the link 2 is not sufficient, the AP MLD may not be able to perform an STR operation using the link 1 and the link 2. If a band separation between the link 2 and the link 3 is not sufficient, the AP MLD may not be able to perform an STR operation using the link 2 and the link 3.

Figure 3:
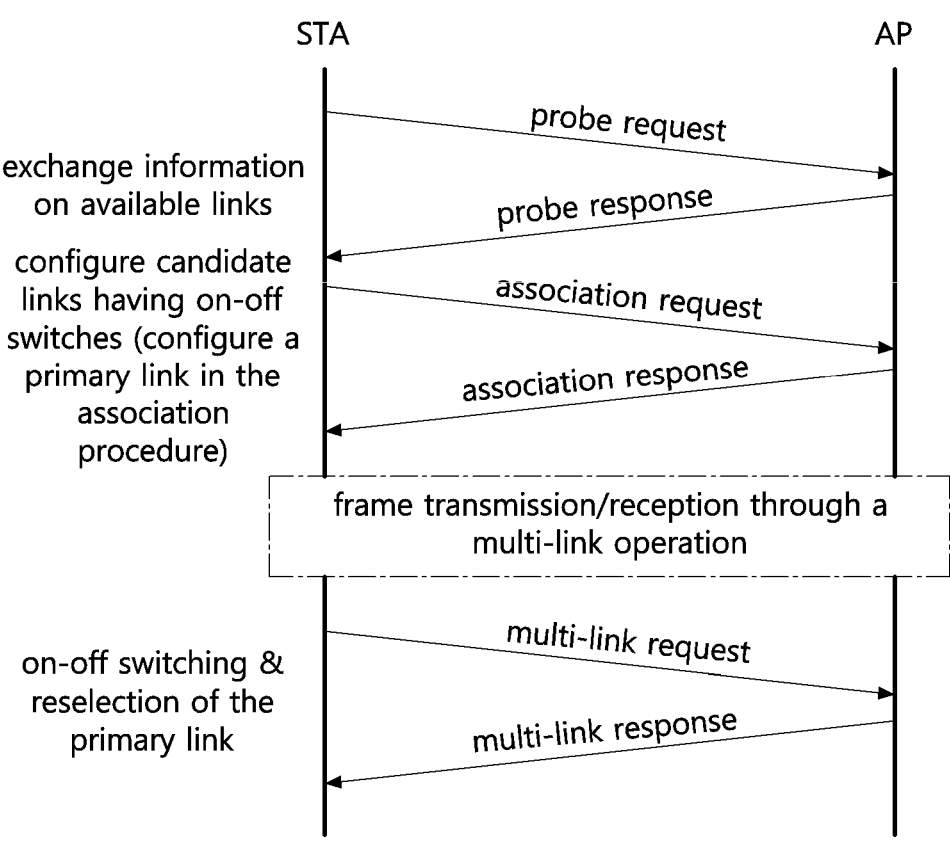
FIG. 3 is a sequence chart illustrating a first exemplary embodiment of a negotiation procedure for a multi-link operation in a wireless LAN system.

FIG. 3 is a sequence chart illustrating a first exemplary embodiment of a negotiation procedure for a multi-link operation in a wireless LAN system.

As shown in FIG. 3 an access procedure between an STA and an AP in an infrastructure basic service set (BSS) may generally be divided into a probe step of probing AP(s), an authentication step for authentication between the STA and the probed AP, and an association step of association between the STA and the authenticated AP.

In the probe step, the STA may detect one or more APs using a passive scanning scheme or an active scanning scheme. When the passive scanning scheme is used, the STA may detect one or more APs by overhearing beacons transmitted by the one or more APs. When the active scanning scheme is used, the STA may transmit a probe request frame, and may detect one or more APs by receiving probe response frames that are responses to the probe request frame from the one or more APs.

When the one or more APs are detected, the STA may perform an authentication step with the detected AP(s). In this case, the STA may perform the authentication step with a plurality of APs. An authentication algorithm according to the IEEE 802.11 standard may be classified into an open system algorithm of exchanging two authentication frames, a shared key algorithm of exchanging four authentication frames, and the like.

The STA may transmit an authentication request frame based on the authentication algorithm according to the IEEE 802.11 standard, and may complete authentication with the AP by receiving an authentication response frame that is a response to the authentication request frame from the AP.

When the authentication with the AP is completed, the STA may perform an association step with the AP. In particular, the STA may select one AP among AP(s) with which the STA has performed the authentication step, and perform the association step with the selected AP. That is, the STA may transmit an association request frame to the selected AP, and may complete the association with the AP by receiving an association response frame that is a response to the association request frame from the selected AP.

Meanwhile, a multi-link operation may be supported in the wireless LAN system. A multi-link device (MLD) may include one or more STAs affiliated with the MLD. The MLD may be a logical entity. The MLD may be classified into an AP MLD and a non-AP MLD. Each STA affiliated with the AP MLD may be an AP, and each STA affiliated with the non-AP MLD may be a non-AP STA. In order to configure a multi-link, a multi-link discovery procedure, a multi-link setup procedure, and the like may be performed. The multi-link discovery procedure may be performed in the probe step between an STA and an AP. In this case, multi-link information elements (ML IEs) may be included in the beacon frame, the probe request frame, and/or the probe response frame.

For example, in order to perform a multi-link operation, in the probe step, the AP (e.g., AP affiliated with an MLD) may exchange information indicating whether the multi-link operation can be used and information on available link(s) with the STA (e.g., non-AP STA affiliated with an MLD). In a negotiation procedure for the multi-link operation (e.g., multi-link setup procedure), the STA may transmit information of link(s) to be used for the multi-link operation. The negotiation procedure for the multi-link operation may be performed in the access procedure (e.g., association step) between the STA and the AP, and information element(s) required for the multi-link operation may be configured or changed by an action frame in the negotiation procedure.

In addition, in the access procedure (e.g., association step) between the STA and the AP, available link(s) of the AP may be configured, and an identifier (ID) may be assigned to each link. Thereafter, in the negotiation procedure and/or change procedure for the multi-link operation, information indicating whether each link is activated may be transmitted, and the information may be expressed using the link ID(s).

The information indicating whether the multi-link operation can be used may be transmitted and received in a procedure of exchanging capability information element(s) (e.g., EHT capability information element(s)) between the STA and the AP. The capability information element(s) may include information of supporting band(s), information of supporting link(s) (e.g., ID(s) and/or number of supporting link(s)), information of links capable of simultaneous transmission and reception (STR) operations (e.g., information on bands of the links, information on a separation between the links), and/or the like. In addition, the capability information element(s) may include information that individually indicates a link capable of the STR operation.

Figure 4A:
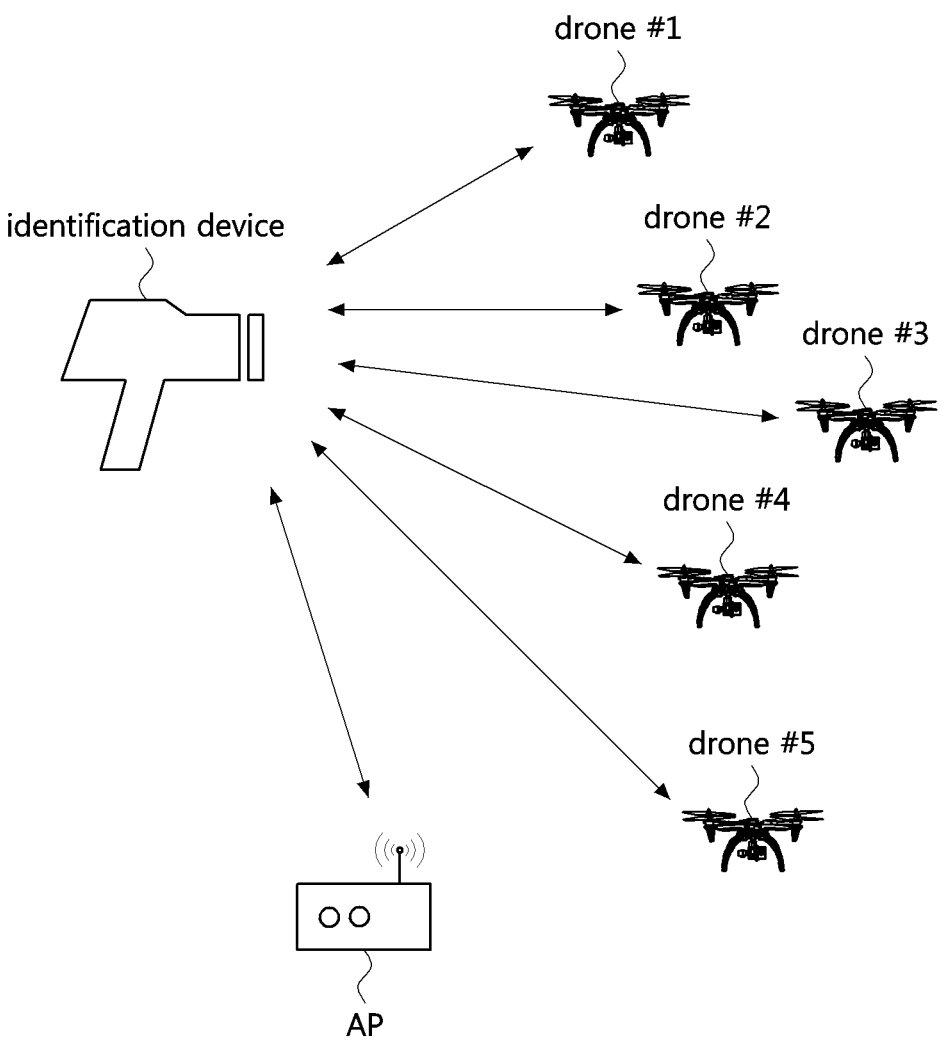
FIG. 4A is a conceptual diagram illustrating a first scenario in which direct communication is performed.
Figure 4B:
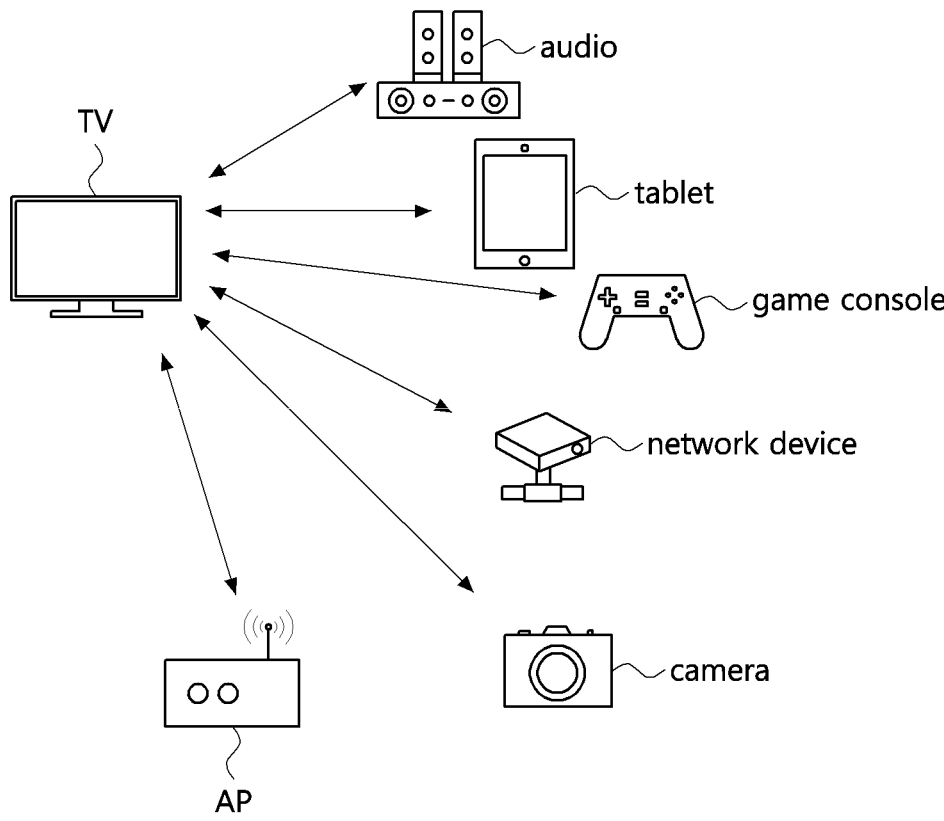
FIG. 4B is a conceptual diagram illustrating a second scenario in which direct communication is performed.

FIG. 4A is a conceptual diagram illustrating a first scenario in which direct communication is performed, and FIG. 4B is a conceptual diagram illustrating a second scenario in which direct communication is performed.

As shown in FIGS. 4A and 4B, an identification device or TV associated with an access point (AP) may perform communications with other communication nodes (e.g., drones, audio, tablet, game console, network device, camera, and the like). Here, the communication may be communication via the access point or direct communication. The direct communication may refer to peer-to-peer (P2P) communication. A communication node (e.g., identification device or TV) among the communication nodes associated with the access point, which directly communicates with another communication node, may be referred to as a 'relay node' or a 'relay station'.

The relay station may obtain a direct communication period by performing a negotiation procedure with the access point, and may directly communicate with other station(s) in the direct communication period. Another station performing direct communication with the relay station may be a station associated with the access point or a station not associated with the access point. A station not associated with the access point may perform direct communication after performing an association procedure with the relay station.

In order to discover station(s) (hereinafter, referred to as 'peer station(s)') with which the relay station will perform direct communication, the relay station may request the access point to provide information on the peer station(s). Alternatively, the relay station may transmit a probe request frame to discover peer station(s), and may identify the peer station(s) by receiving probe response frame(s) that is a response to the probe request frame. Here, the probe request frame transmitted from the relay station may be used to discover the peer station(s).

Figure 5:
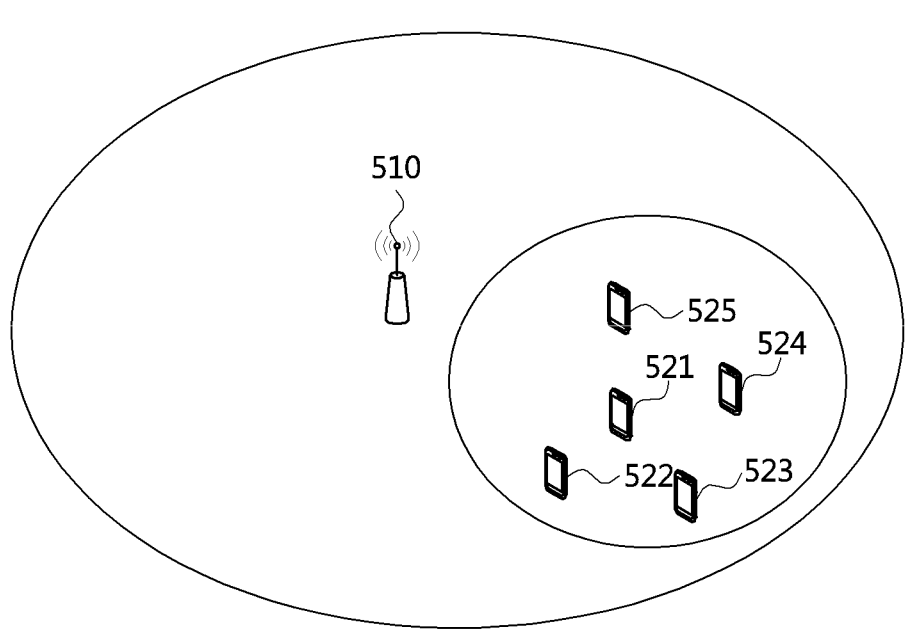
FIG. 5 is a conceptual diagram illustrating a first exemplary embodiment of a wireless LAN system supporting direct communication.

FIG. 5 is a conceptual diagram illustrating a first exemplary embodiment of a wireless LAN system supporting direct communication.

As shown in FIG. 5, a wireless LAN system may include an access point 510 and a plurality of stations 521, 522, 523, 524, and 525. The station 521 may be associated with the access point 510 and may be a relay station. The station 522, the station 523, the station 524, and the station 525 may each be a peer station. The station 521 may directly communicate with the peer station.

Figure 6:
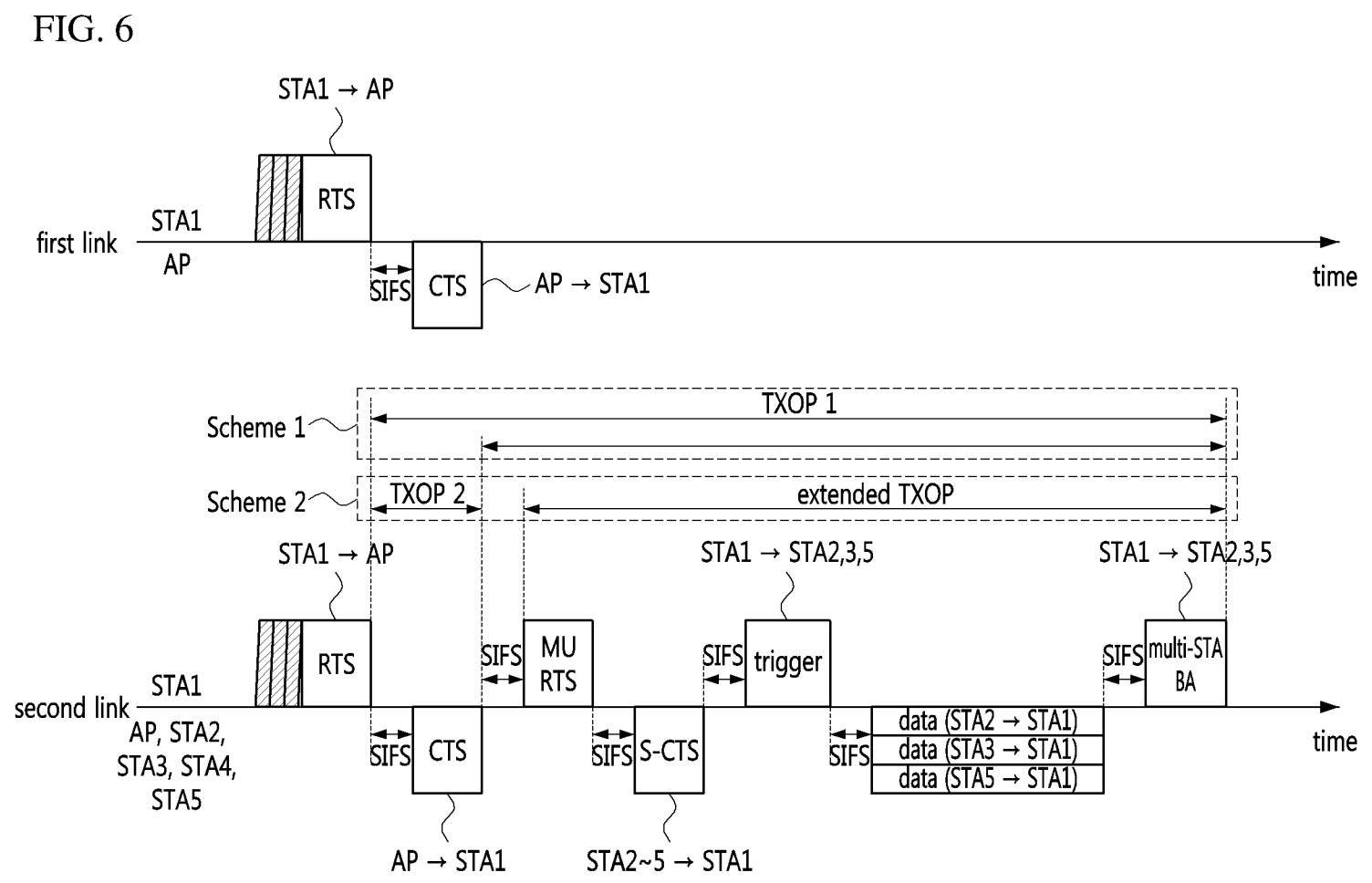

FIG. 6 is a conceptual diagram illustrating a first exemplary embodiment of a direct communication method in a wireless LAN system.

As shown in FIG. 6, a direct communication method illustrated in FIG. 6 may be applied to the wireless LAN system illustrated in FIG. 5. An access point (AP) may be the access point 510 illustrated in FIG. 5. The STA1 may be the station 521 illustrated in FIG. 5. The STA1 may be associated with the access point and may operate as a relay station. The STA2 may be the station 522 illustrated in FIG. 5, the STA3 may be the station 523 illustrated in FIG. 5, the STA4 may be the station 524 illustrated in FIG. 5, and the STA5 may be the station 525 illustrated in FIG. 5. One or more of the STA2 to STA5 may operate as peer station(s).

A communication node (e.g., access point or station) may perform a multi-link operation and may have a different MAC address for each link. The AP MLD may have an affiliated AP for each link, and the AP MLD and the affiliated AP may have different MAC addresses. The STA MLD may have an affiliated STA for each link, and the STA MLD and the affiliated STA may have different MAC addresses. The APs affiliated with the AP MLD may be configured as one device, and the AP MLD may control the affiliated APs to perform a multi-link operation. The STAs affiliated with the STA MLD may be configured as one device, and the STA MLD may control the affiliated STAs to perform a multi-link operation. For communication in a specific link, a MAC address of the AP or a MAC address of the STA associated with the specific link may be configured as a receiver address. Alternatively, the MAC address of the AP MLD or the STA MLD may be configured as a receiver address. In exemplary embodiments, the access point may be an 'AP MLD' or an 'AP affiliated with an AP MLD' and the station may be a 'STA MLD' or a 'STA affiliated with a STA MLD'. The STA1 may perform a setup procedure (e.g., negotiation procedure) for direct communication with the access point. In the setup procedure for direct communication, a link for direct communication and/or a direct communication period (e.g., transmit opportunity (TXOP)) may be configured. All stations (e.g., all peer stations) may synchronize to a primary link (e.g., a first link). The primary link may be a link at 2.4 GHz. A link of a low frequency band (e.g., 2.4 GHz band) may be configured as the primary link. A link of a high frequency band (e.g., 5 GHz or 6 GHz band) may be configured as a direct communication link.

At the beginning of a communication procedure, all stations (e.g., STA2 to STA5) may perform a monitoring operation on the primary link, and may switch a communication link from the primary link to the direct communication link according to a procedure initiated by a relay station (e.g., STA1).

The STA1 may transmit a request-to-send (RTS) frame(s) in one or more links (e.g., first link and/or second link) to configure the direct communication link. The one or more links may include the primary link and a candidate direct communication link. The candidate direct communication link may be a link in which direct communication is to be performed. In order to indicate an RTS frame for direct communication, a receiver address (RA) field of the RTS frame may be set to an address indicating direct communication instead of an address of the access point. A transmitter address (TA) field of the RTS frame may be set to an address of the STA1.

When direct communication is to be performed in the second link, the RA field of the RTS frames transmitted in the first link and the second link may be set to an address in the second link (e.g., a basic service set (BSS) identifier (ID) or MAC address of the access point in the second link, or a MAC address of the STA1 in the second link). The access point may receive the RTS frames from the STA1 in the first link and the second link, and identify that direct communication is requested in the second link based on information (e.g., RA field) included in the RTS frame. The access point may determine whether to allow direct communication in the second link (e.g., candidate direct communication link) indicated by the RTS frame.

When direct communication is allowed in the second link, the access point may transmit a clear-to-send (CTS) frame(s) in one or more links in response to the RTS frame. If direct communication is not allowed in the second link, the CTS frame may not be transmitted. The CTS frame may be transmitted after a short interframe space (SIFS) from a reception time of the RTS frame. An RA field of the CTS frame may be set to an address in a link (e.g., the second link) in which direct communication is allowed. For example, the RA field of the CTS frame may be set to the MAC address of the STA1 in the second link or the MAC address of the access point in the second link. When a channel state of the link indicated by the RTS frame (e.g., candidate direct communication link) is a busy state, the access point may configure another link (e.g., third link) as the direct communication link. In this case, the RA field of the CTS frame may not be set to the address of the link indicated by the RTS frame but to the address of the link determined by the access point (e.g., a MAC address of the STA1 in the third link).

Upon receiving the CTS frame from the access point, the STA1 may determine that direct communication is allowed by the access point. Also, the STA1 may identify the link in which direct communication is to be performed based on information (e.g., RA field) included in the CTS frame. The STA1 may perform a setup procedure for direct communication with peer station(s) in the link (e.g., the second link) indicated by the CTS frame.

The STA1 may transmit a multi-user (MU) RTS frame in the second link (e.g., direct communication link) to discover peer station(s). The MU RTS frame may include information indicating that direct communication is to be performed in the corresponding link (e.g., the second link). The stations may receive the MU RTS frame from the STA1. Among the stations receiving the MU RTS frame, stations (e.g., peer stations) participating in direct communication may transmit a simultaneous (S)-CTS frame to the STA1 in the second link. Here, the S-CTS frame may be a CTS frame simultaneously transmitted by each of stations participating in direct communication. The S-CTS frame may include one or more parameters included in the MU-RTS frame received by the stations. Here, the peer stations may be the STA2, the STA3, the STA4, and the STA5. The STA2, the STA3, the STA4, and the STA5 may transmit the same CTS frame at the same time. The STA1 may receive the S-CTS frames in response to the MU RTS frame, and may determine that the STA2, the STA3, the STA4, and the STA5 participate in direct communication based on the S-CTS frames. Reception of the S-CTS frame(s) may mean presence of peer station(s). The discovery procedure for peer station(s) (e.g., the transmission/reception procedure of the MU-RTS frame and the S-CTS frame(s)) may be performed before the direct communication starts.

The STA1 may allocate resources for direct communication with the peer station(s) and may generate a trigger frame including resource allocation information. The trigger frame may include resource allocation information for the STA2, resource allocation information for the STA3, and resource allocation information for the STA5. The STA1 may transmit the trigger frame in the second link. The trigger frame may be transmitted after a SIFS from a reception time of the S-CTS frame. The trigger frame may be used to allocate resources for transmission of data frames to the peer station(s) participating in the direct communication.

The peer stations may receive the trigger frame from the STA1 (e.g., relay station) in the second link and identify the resource allocation information included in the trigger frame. Since resource allocation information for the STA2, STA3, and STA5 are included in the trigger frame, each of the STA2, STA3, and STA5 may transmit a data frame in the second link after a SIFS from a reception time of the trigger frame. Since resource allocation information for the STA4 is not included in the trigger frame, the STA4 may not perform direct communication in the second link. The data frames may be transmitted/received in an OFDMA scheme.

The STA1 may receive the data frames from the STA2, STA3, and STA5 in the second link, and transmit a multi-STA block acknowledgment (BA) frame for the data frames to the STA2, STA3, and STA5 in the second link. The STA2, STA3, and STA5 may receive the multi-STA BA frame from the STA1 in the second link.

A direct communication period (e.g., TXOP) may be configured based on Scheme 1 or Scheme 2. In Scheme 1, a value of a duration field of the RTS frame for direct communication (e.g., the RTS frame transmitted from the STA1 in the second link) may be set to a length of a TXOP including a time required for the direct communication (e.g., a length from an end time of the RTS frame to an end time of the multi-STA BA frame). A value of a duration field of the RTS frame transmitted in the first link may be set to a length of a TXOP including a time required for the RTS-CTS operation (e.g., a length from the end time of the RTS frame to an end time of the CTS frame).

When direct communication is allowed, a value of a duration field of the CTS frame (e.g., the CTS frame transmitted from the access point in the second link) that is a response to the RTS frame may be set to a length of a TXOP including a time required for direct communication (e.g., a length from the end time of the CTS frame to the end time of the multi-STA BA frame). A value of a duration field of a frame transmitted after the CTS frame in the second link may indicate a period until the end time of the multi-STA BA frame. The value of the duration field of the CTS frame transmitted in the first link may be set to a length of a TXOP including a time required for the RTS-CTS operation.

In Scheme 2, the value of the duration field of the RTS frame for direct communication may be set to a length of a TXOP including a time required for the RTS-CTS operation (e.g., a length from the end time of the RTS frame to the end time of the CTS frame), and a value of a duration field of the MU RTS frame may be set to a length of a TXOP (e.g., extended TXOP) including a time required for direct communication (e.g., a length from a start time or an end time of the MU RTS frame to the end time of the multi-STA BA frame). A value of a duration field of a frame transmitted after the MU RTS frame in the second link may indicate a period until the end time of the multi-STA BA frame.

Figure 7:
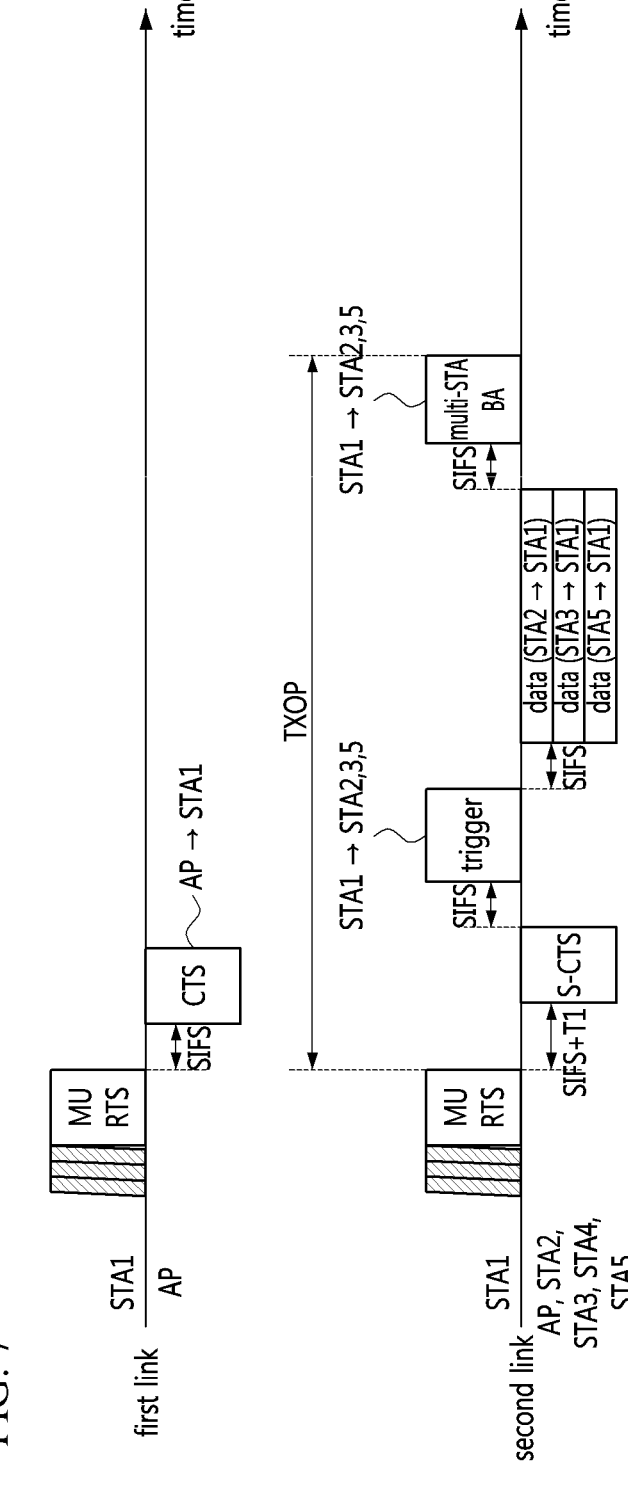
FIG. 7 is a conceptual diagram illustrating a second exemplary embodiment of a direct communication method in a wireless LAN system.

FIG. 7 is a conceptual diagram illustrating a second exemplary embodiment of a direct communication method in a wireless LAN system.

As shown in FIG. 7, a direct communication method illustrated in FIG. 7 may be applied to the wireless LAN system illustrated in FIG. 5. An access point (AP) may be the access point 510 illustrated in FIG. 5. The STA1 may be the station 521 illustrated in FIG. 5. The STA1 may be associated with the access point and may operate as a relay station. The STA2 may be the station 522 illustrated in FIG. 5, the STA3 may be the station 523 illustrated in FIG. 5, the STA4 may be the station 524 illustrated in FIG. 5, and the STA5 may be the station 525 illustrated in FIG. 5. One or more of the STA2 to STA5 may operate as peer station(s).

A communication node (e.g., access point or station) may perform a multi-link operation and may have a different MAC address for each link. The STA1 may perform a setup procedure (e.g., negotiation procedure) for direct communication with the access point. In the setup procedure for direct communication, a link for direct communication and/or a direct communication period (e.g., TXOP) may be configured. All stations (e.g., all peer stations) may synchronize to a primary link (e.g., a first link). The primary link may be a link at 2.4 GHz. A link of a low frequency band (e.g., 2.4 GHz band) may be configured as the primary link. A link of a high frequency band (e.g., 5 GHz or 6 GHz band) may be configured as a direct communication link.

At the beginning of a communication procedure, all stations (e.g., STA2 to STA5) may perform a monitoring operation on the primary link, and may switch a communication link from the primary link to the direct communication link according to a procedure initiated by a relay station (e.g., STA1).

The STA1 (e.g., relay station) may transmit MU RTS frames in the first link and the second link to initiate a direct communication procedure. A type of the MU RTS frame may be set to a direct communication type. The MU RTS frame may include information indicating a link (e.g., second link) in which direct communication is to be performed. The MU RTS frame may be transmitted to discover peer station(s). The access point may receive the MU RTS frame from the STA1 and may identify that direct communication is requested based on the MU RTS frame. Also, the access point may identify the link in which direct communication is to be performed based on information included in the MU RTS frame.

When direct communication is allowed, the access point may transmit a CTS frame in the first link in response to the MU RTS frame. The CTS frame may indicate that direct communication is allowed. The CTS frame may include information indicating the link in which direct communication is to be performed. An RA field of the CTS frame may be set to a MAC address of the STA1 (e.g., STA MLD) in the direct communication link (e.g., the second link) or a MAC address of the access point in the second link. The STA1 may receive the CTS frame from the access point in the first link. When the CTS frame is received, the STA1 may determine that direct communication is allowed. Also, the STA1 may identify the direct communication link (e.g., second link) based on information included in the CTS frame. If the CTS frame is not received from the access point, the STA1 may determine that the access point rejects the direct communication request.

The stations may receive the MU RTS frame from the STA1 in the second link. Among the stations receiving the MU RTS frame, stations (e.g., peer stations) participating in direct communication may transmit an S-CTS frame to the STA1 in the second link. Here, the S-CTS frame may be a CTS frame simultaneously transmitted by each of the stations participating in direct communication. The S-CTS frame may include one or more parameters included in the MU-RTS frame received by the stations. Here, the peer stations may be the STA2, STA3, STA4, and STA5. The STA2, STA3, STA4, and STA5 may transmit the same CTS frame at the same time. The STA1 may receive the S-CTS frames in response to the MU RTS frame, and may determine that the STA2, STA3, STA4, and STA5 participate in direction communication based on the S-CTS frames. Reception of the S-CTS frame(s) may mean presence of the peer station(s).

The S-CTS frame may be transmitted using a power (e.g., minimum power) receivable by the STA1. To support this operation, the STA1 may transmit the MU RTS frame using a specific power in the second link. The peer station may measure a received signal strength of the MU RTS frame, and may calculate the power receivable by the STA1 based on the measured received signal strength. The peer station may transmit the S-CTS frame using the calculated power. When a radio channel has the same characteristics in both directions (e.g., uplink and downlink), the received signal strength may be used to determine the power of the transmitted signal.

Meanwhile, a station not participating in direct communication may set a network allocation vector (NAV) based on a value of a duration field included in the MU RTS frame and/or the S-CTS frame. Among the stations not participating in direct communication, a station that has received the MU RTS frame but has not received the S-CTS frame may not set a NAV.

The access point may transmit the CTS frame in the first link to allow direct communication, but may not transmit the S-CTS frame in the second link. A station (e.g., peer station) desiring to perform direct communication may switch a communication link from the first link to the second link while performing a monitoring operation on the first link. A time may be required for the switching operation of the communication link. Taking this into consideration, the S-CTS frame may be transmitted in the second link after a (SIFS+T1) from a reception time of the MU RTS frame. Information indicating T1 may be included in the MU RTS frame. (SIFS+T1) may be a point coordination function (PCF) interframe space (PIFS). (SIFS+T1) may be equal to or less than a distributed coordination function (DCF) interframe space (DIFS) or an arbitration interframe space (AIFS). T1 may be set to zero.

Meanwhile, when the S-CTS frame is received, the STA1 may allocate resources for direct communication with peer station(s) and may generate a trigger frame including resource allocation information. The trigger frame may include resource allocation information for the STA2, resource allocation information for the STA3, and resource allocation information for the STA5. The STA1 may transmit the trigger frame in the second link. The trigger frame may be transmitted after a SIFS from a reception time of the S-CTS frame. The trigger frame may be used to allocate resources for transmission of data frames to the peer station(s) participating in direct communication.

The peer stations may receive the trigger frame from the STA1 (e.g., relay station) in the second link and identify the resource allocation information included in the trigger frame. Since the resource allocation information for the STA2, STA3, and STA5 are included in the trigger frame, each of the STA2, STA3, and STA5 may transmit a data frame in the second link after a SIFS from a reception time of the trigger frame. Since resource allocation information for the STA4 is not included in the trigger frame, the STA4 may not perform direct communication in the second link.

The STA1 may receive the data frames from the STA2, STA3, and STA5 in the second link, and transmit a multi-STA BA frame for the data frames to the STA2, STA3, and STA5 in the second link. The STA2, STA3, and STA5 may receive the multi-STA BA from the STA1 in the second link.

Meanwhile, the trigger frame may be transmitted when the CTS frame (e.g., frame indicating allowance of direct communication) is received from the access point in the first link. If the CTS frame is not received in the first link, the STA1 may not transmit the trigger frame in the second link. In this case, the STA1 may transmit a contention free (CF)-END frame in the second link to return a TXOP (e.g., TXOP configured for direct communication). When the CF-END frame is transmitted, the TXOP may be terminated. The CF-END frame may indicate that an end time of the CF-END frame is an end time of the TXOP. The CF-END frame may be a null frame (e.g., null MAC frame) that does not include data. A null frame may be transmitted instead of the CF-END frame. A value of a duration field included in the CF-END frame (or null frame) may indicate a period until the end time of the CF-END frame (or null frame).

FIG. 8 is a conceptual diagram illustrating a third exemplary embodiment of a direct communication method in a wireless LAN system.

As shown in FIG. 8, a direct communication method illustrated in FIG. 8 may be applied to the wireless LAN system illustrated in FIG. 5. An access point (AP) may be the access point 510 illustrated in FIG. 5. The STA1 may be the station 521 illustrated in FIG. 5. The STA1 may be associated with the access point and may operate as a relay station. The STA2 may be the station 522 illustrated in FIG. 5, the STA3 may be the station 523 illustrated in FIG. 5, the STA4 may be the station 524 illustrated in FIG. 5, and the STA5 may be the station 525 illustrated in FIG. 5. One or more of the STA2 to STA5 may operate as peer station(s).

A communication node (e.g., access point or station) may perform a multi-link operation and may have a different MAC address for each link. The STA1 may perform a setup procedure (e.g., negotiation procedure) for direct communication with the access point. In the setup procedure for direct communication, a link for direct communication and/or a direct communication period (e.g., TXOP) may be configured. All stations (e.g., all peer stations) may synchronize to a primary link (e.g., a first link). The primary link may be a link at 2.4 GHz. A link of a low frequency band (e.g., 2.4 GHz band) may be configured as the primary link. A link of a high frequency band (e.g., 5 GHz or 6 GHz band) may be configured as a direct communication link.

At the beginning of a communication procedure, all stations (e.g., STA2 to STA5) may perform a monitoring operation on the primary link, and may switch a communication link from the primary link to the direct communication link according to a procedure initiated by a relay station (e.g., STA1).

The STA1 may transmit RTS frames in the first link and the second link to initiate a direct communication procedure. The RTS frame may include information indicating a candidate direct communication link. For example, when direct communication is to be performed in the second link, an RA filed of the RTS frame may be set to a MAC address or a BSS ID of an AP using the second link, and a TA field of the RTS frame may be set to a MAC address of the STA1. When the RA field of the RTS frame is set to a MAC address in the second link, this may indicate that direct communication is requested in the second link.

The access point may receive the RTS frame from the STA1 and may identify that direct communication is requested in the second link based on information (e.g., RA field and/or TA field) included in the RTS frame. If direct communication is allowed in the second link, the access point may transmit a CTS frame in the first link and/or the second link in response to the RTS frame. The CTS frame may include information indicating that direct communication is allowed in the second link. An RA field of the CTS frame may be set to an address of the link (e.g., second link) in which direct communication is allowed. For example, the RA field of the CTS frame may be set to the MAC address of the STA1 in the second link or the MAC address of the access point in the second link.

A direct communication period (e.g., TXOP) may be configured based on the above-described Scheme 1 or Scheme 2 (e.g., Scheme 1 or Scheme 2 shown in FIG. 6). When Scheme 2 is applied to the exemplary embodiment shown in FIG. 8, a TXOP2 may be configured as (SIFS+transmission time of the CTS frame+SIFS+T1). T1 may be a time required for the switching operation of the communication link in the station. T1 may be zero.

The peer stations operating in the first link may identify that a direct communication procedure is initiated in the second link. In this case, the peer stations may switch the communication link from the first link to the second link. When the CTS frame is received from the access point in the first link, the peer stations may transmit a CTS-to-Self frame in the second link. An RA field of the CTS-to-Self frame may be set to the MAC address of the STA1 in the second link. The CTS-to-Self frame may be transmitted at a preset time without receiving the RTS frame or the MU-RTS frame. In order to limit a transmission region of the CTS-to-Self frame, the CTS-to-Self frame may be transmitted using a power required for direct communication (e.g., low power). The peer stations may receive the CTS-to-Self frame from the STA1 in the second link.

After transmitting the CTS-to-Self frame, the STA1 may allocate resources for direct communication with the peer station(s) and may generate a trigger frame including resource allocation information. The trigger frame may include resource allocation information for the STA2, resource allocation information for the STA3, and resource allocation information for the STA5. The STA1 may transmit the trigger frame in the second link. The trigger frame may be transmitted after a SIFS from an end time of the CTS-to-Self frame. The trigger frame may be used to allocate resources for transmission of data frames to the peer station(s) participating in direct communication.

The peer stations may receive the trigger frame from the STA1 (e.g., relay station) in the second link and identify the resource allocation information included in the trigger frame. Since the resource allocation information for the STA2, STA3, and STA5 are included in the trigger frame, each of the STA2, STA3, and STA5 may transmit a data frame in the second link after a SIFS from a reception time of the trigger frame. Since resource allocation information for the STA4 is not included in the trigger frame, the STA4 may not perform direct communication in the second link.

The STA1 may receive the data frames from the STA2, STA3, and STA5 in the second link, and transmit a multi-STA BA frame for the data frames to the STA2, STA3, and STA5 in the second link. The STA2, STA3, and STA5 may receive the multi-STA BA from the STA1 in the second link.

Figure 9A:
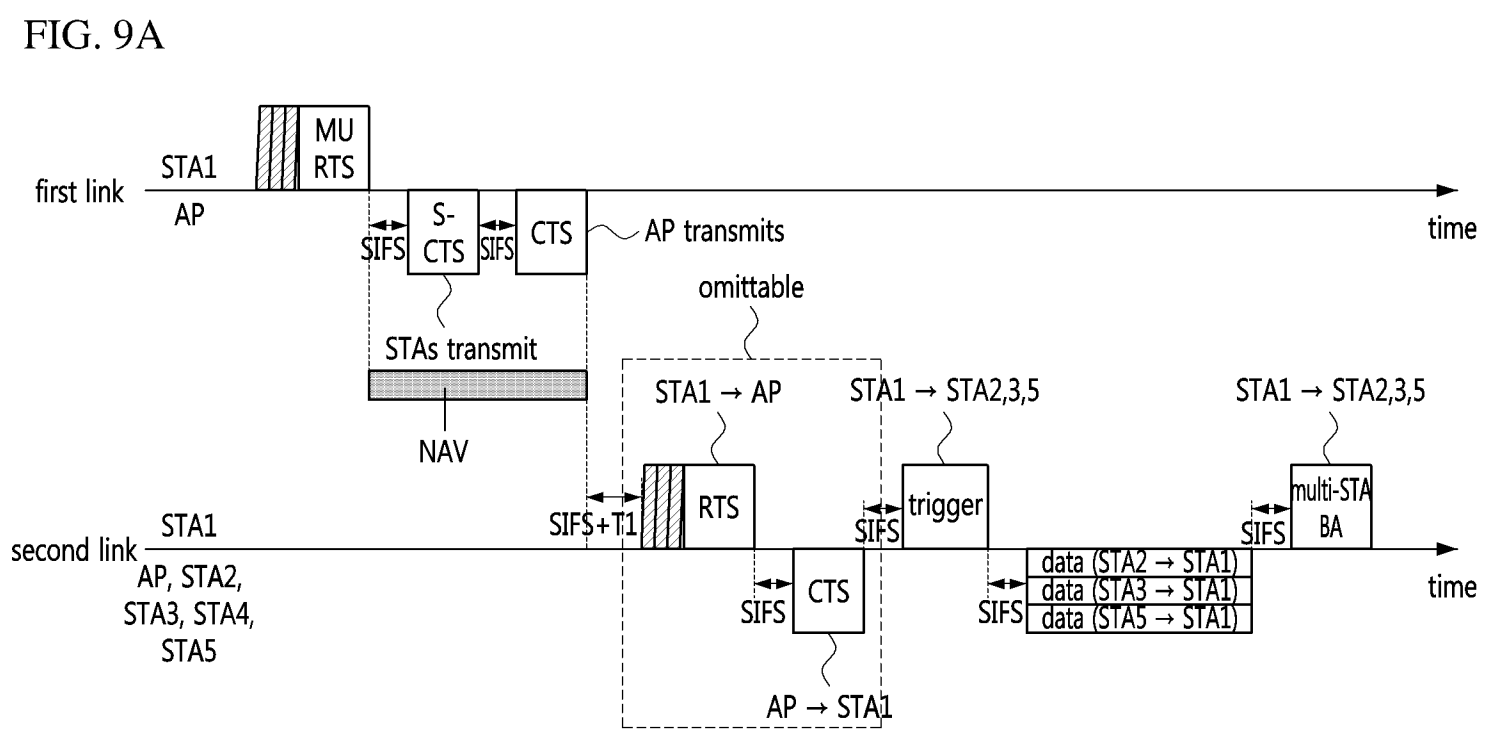
Figure 9B:
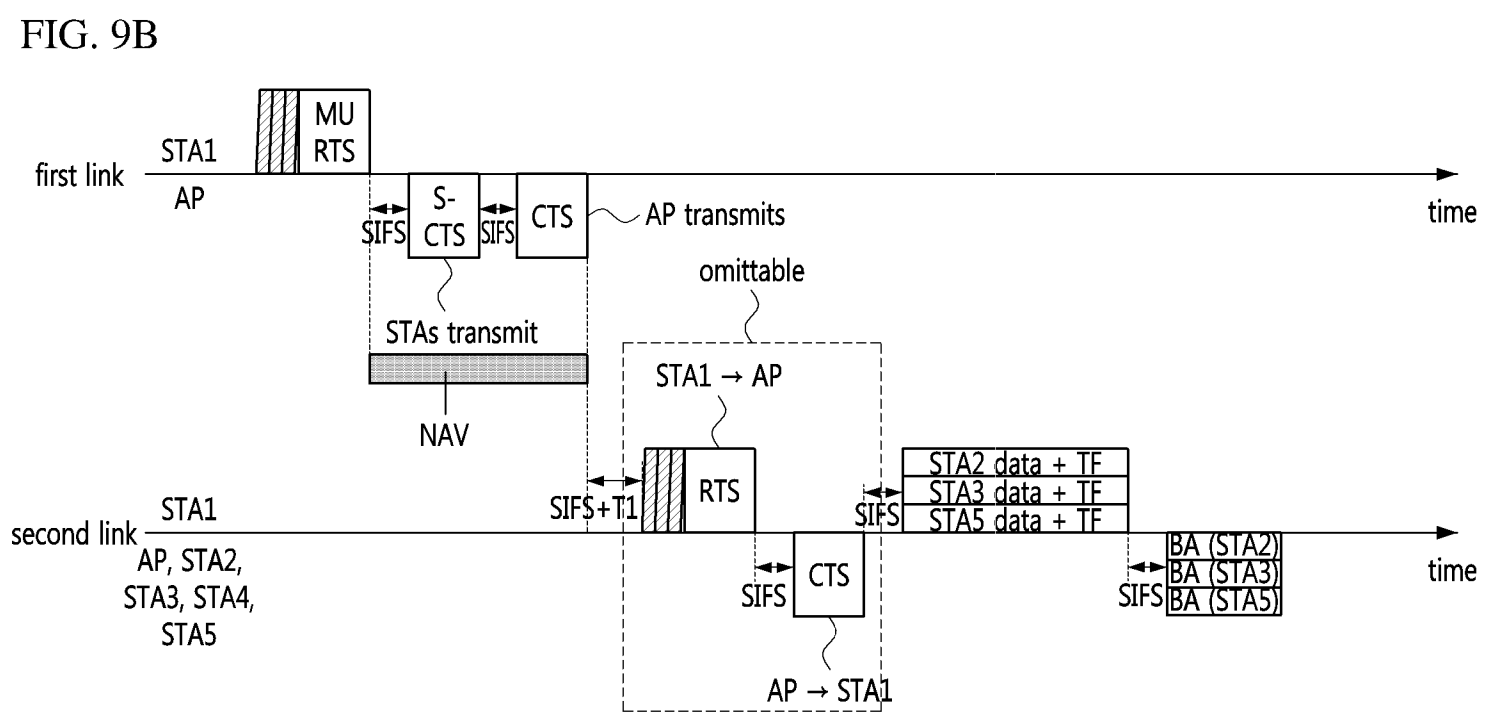

FIG. 9A is a conceptual diagram illustrating a fourth exemplary embodiment of a direct communication method in a wireless LAN system, and FIG. 9B is a conceptual diagram illustrating a fifth exemplary embodiment of a direct communication method in a wireless LAN system.

As shown in FIGS. 9A and 9B, a direct communication method illustrated in FIGS. 9A and 9B may be applied to the wireless LAN system illustrated in FIG. 5. An access point (AP) may be the access point 510 illustrated in FIG. 5. The STA1 may be the station 521 illustrated in FIG. 5. The STA1 may be associated with the access point and may operate as a relay station. The STA2 may be the station 522 illustrated in FIG. 5, the STA3 may be the station 523 illustrated in FIG. 5, the STA4 may be the station 524 illustrated in FIG. 5, and the STA5 may be the station 525 illustrated in FIG. 5. One or more of the STA2 to STA5 may operate as peer station(s).

A communication node (e.g., access point or station) may perform a multi-link operation and may have a different MAC address for each link. The STA1 may perform a setup procedure (e.g., negotiation procedure) for direct communication with the access point. In the setup procedure for direct communication, a link for direct communication and/or a direct communication period (e.g., TXOP) may be configured. All stations (e.g., all peer stations) may synchronize to a primary link (e.g., a first link). The primary link may be a link at 2.4 GHZ. A link of a low frequency band (e.g., 2.4 GHz band) may be configured as the primary link. A link of a high frequency band (e.g., 5 GHz or 6 GHz band) may be configured as a direct communication link.

A direct communication procedure may be divided into two steps. The first step of the direct communication procedure may be performed within a first TXOP, and the second step of the direct communication procedure may be performed within a second TXOP. The first step of the direct communication procedure may be a discovery procedure of peer station(s). The second step of the direct communication procedure may be a procedure for performing direct communication between a relay station and the discovered peer station(s).

In the first step of the direct communication procedure, the STA1 may transmit an MU RTS frame in the first link (e.g., primary link). A value of a duration field (e.g., first TXOP) included in the MU RTS frame may indicate a period until an end time of an S-CTS frame. Alternatively, when the access point transmits a CTS frame, the value of the duration field (e.g., first TXOP) included in the MU RTS frame may indicate a period until an end time of the CTS frame transmitted by the access point. The access point and/or peer station(s) may receive the MU RTS frame and may transmit S-CTS frame(s) in response to the MU RTS frame in the first link. The S-CTS frame may be transmitted at a preset time.

Here, the S-CTS frame may be a CTS frame simultaneously transmitted by each of stations participating in direct communication. The S-CTS frame may include one or more parameters included in the MU-RTS frame received by the stations.

In the operation of transmitting the S-CTS frames, the same CTS frames may be transmitted. Therefore, a station that has transmitted the S-CTS frame (e.g., the same CTS frame) may not be identified. To solve this problem, the stations participating in direct communication may transmit the S-CTS frames, and the access point receiving the S-CTS frames may transmit the CTS frame when allowing direct communication. The CTS frame may be transmitted after a SIFS from a reception time of the S-CTS frame. The STA1 may identify the presence of the peer station(s), and may perform an operation for initiating the direct communication procedure in the second link after a link switching time (e.g., SIFS+T1) of the peer station.

The STA1 may perform a channel access operation to transmit an RTS frame after the link switching time in the second link. If the channel access operation is successful, the STA1 may transmit an RTS frame in the second link. The RTS frame may request to perform direct communication in the second link. The access point may receive the RTS frame from the STA1 in the second link, and may identify that direct communication is requested in the second link based on the RTS frame. The access point may determine whether to allow direct communication in the second link. When direct communication is allowed in the second link, the access point may transmit a CTS frame in the second link after a SIFS from a reception time of the RTS frame. The CTS frame may include information indicating a time required for direct communication in the second link. When direct communication in the second link is rejected, the access point may transmit a CTS frame including information indicating a transmission time of the CTS frame in the second link.

The STA1 may receive the CTS frame from the access point. The STA1 may identify whether direct communication is allowed in the second link based on the information included in the CTS frame. When the information included in the CTS frame indicates a time required for direct communication, the STA1 may determine that direct communication is allowed in the second link. When the information included in the CTS frame indicates the transmission time of the CTS frame, the STA1 may determine that direct communication in the second link is rejected.

When direct communication is allowed in the second link, the STA1 may allocate uplink resources for direct communication with the peer station(s) and may generate a trigger frame including resource allocation information. The trigger frame may include resource allocation information for the STA2, resource allocation information for the STA3, and resource allocation information for the STA5. The STA1 may transmit the trigger frame in the second link. The trigger frame may be transmitted after a SIFS from a reception time of the S-CTS frame. The trigger frame may be used to allocate resources for transmission of data frames to the peer station(s) participating in direct communication.

The peer stations may receive the trigger frame from the STA1 (e.g., relay station) in the second link and identify the resource allocation information included in the trigger frame. Since the resource allocation information for the STA2, STA3, and STA5 are included in the trigger frame, each of the STA2, STA3, and STA5 may transmit a data frame in the second link after a SIFS from a reception time of the trigger frame. Since resource allocation information for the STA4 is not included in the trigger frame, the STA4 may not perform direct communication in the second link.

The STA1 may receive the data frames from the STA2, STA3, and STA5 in the second link, and may transmit a multi-STA BA frame for the data frames to the STA2, STA3, and STA5 in the second link. The STA2, STA3, and STA5 may receive the multi-STA BA from the STA1 in the second link.

In a downlink communication procedure, the STA1 may generate a trigger frame including data. The trigger frame may include information on a transmission resource of an ACK frame (e.g., BA frame) for the data. The peer station(s) may receive the trigger frame from the STA1 in the second link and identify the data included in the trigger frame. Also, the peer station(s) may transmit a BA frame for the data based on the information on the transmission resource included in the trigger frame. Alternatively, the operation of transmitting the RTS frame and the operation of receiving the CTS frame allowing direct communication in the second link may be omitted. That is, the STA1 may perform a channel access operation for direct communication without performing the RTS-CTS operation. In this case, after switching from the first link to the second link, the channel access operation may be performed instead of the operation of transmitting the RTS frame for direct communication request. When the channel access operation is successful in uplink direct communication, a trigger frame may be transmitted. If the channel access operation is successful in downlink direct communication, data may be transmitted to the peer stations.

Figure 10A:
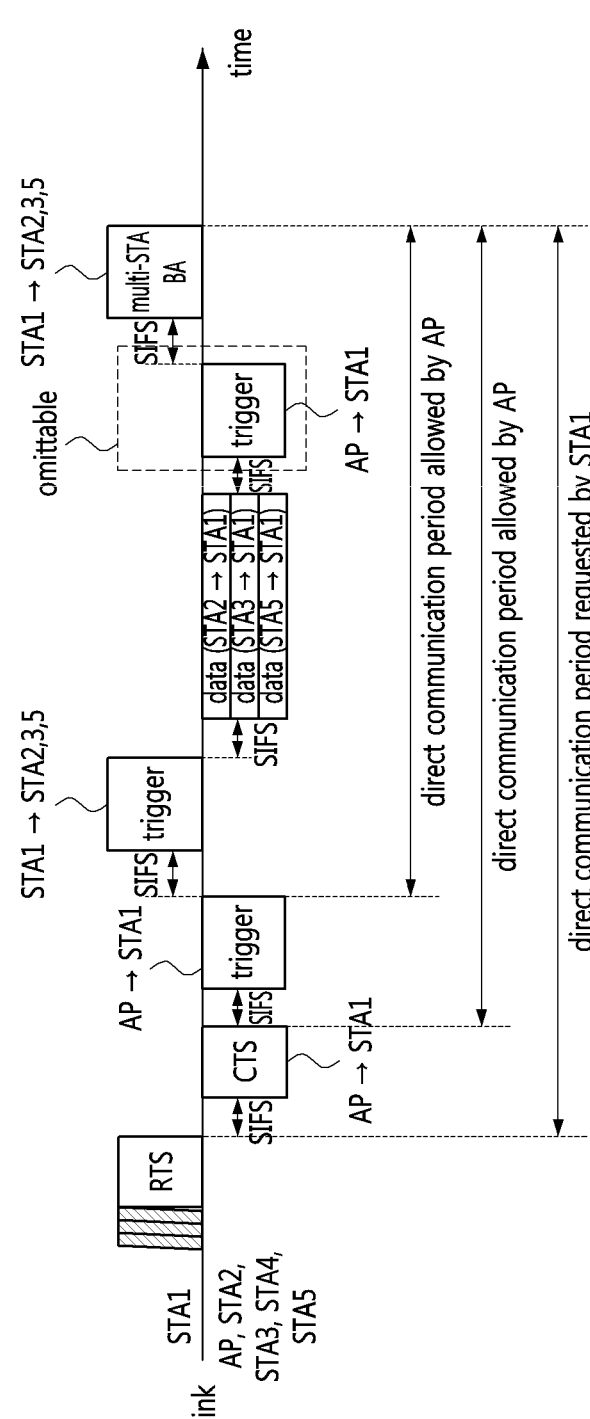
FIG. 10A is a conceptual diagram illustrating a sixth exemplary embodiment of a direct communication method in a wireless LAN system.
Figure 10B:
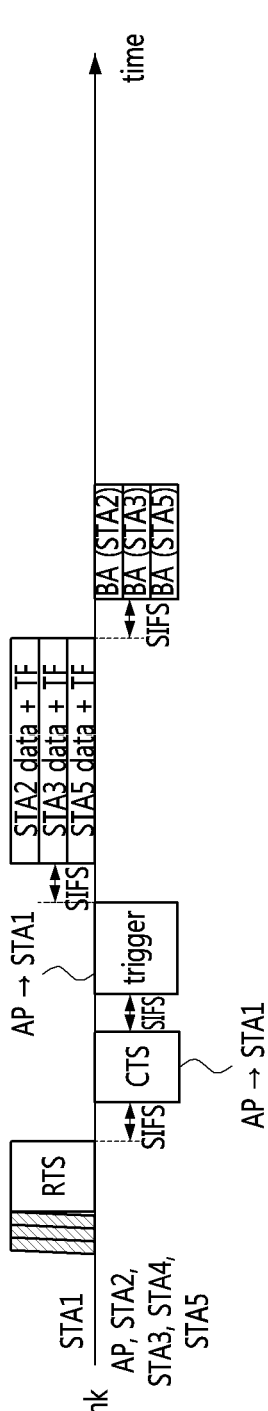
FIG. 10B is a conceptual diagram illustrating a seventh exemplary embodiment of a direct communication method in a wireless LAN system.

FIG. 10A is a conceptual diagram illustrating a sixth exemplary embodiment of a direct communication method in a wireless LAN system, and FIG. 10B is a conceptual diagram illustrating a seventh exemplary embodiment of a direct communication method in a wireless LAN system.

As shown in FIGS. 10A and 10B, a direct communication method illustrated in FIGS. 10A and 10B may be applied to the wireless LAN system illustrated in FIG. 5. An access point (AP) may be the access point 510 illustrated in FIG. 5. The STA1 may be the station 521 illustrated in FIG. 5. The STA1 may be associated with the access point and may operate as a relay station. The STA2 may be the station 522 illustrated in FIG. 5, the STA3 may be the station 523 illustrated in FIG. 5, the STA4 may be the station 524 illustrated in FIG. 5, and the STA5 may be the station 525 illustrated in FIG. 5. One or more of the STA2 to STA5 may operate as peer station(s). A communication node (e.g., access point or station) may perform a multi-link operation and may have a different MAC address for each link.

In order to initiate a direct communication procedure, the STA1 (e.g., relay station) may transmit an RTS frame including information indicating that direct communication is to be performed. The RTS frame may be transmitted in a link in which direct communication is to be performed. A TA field and/or an RA field of the RTS frame may be set to an address of the STA1. In this case, the RTS frame may indicate that direct communication is to be performed. The access point may receive the RTS frame from the STA1. When the TA field and/or RA field of the RTS frame is set to an address of the STA1, the access point may determine that direct communication by the STA1 is requested. When direct communication is allowed, the access point may transmit a CTS frame to the STA1 after a SIFS from a reception time of the RTS frame. The CTS frame may include information indicating a direct communication period (e.g., TXOP).

The access point may transmit a trigger frame after a transmission time of the CTS frame (e.g., after a SIFS) to control the direct communication. That is, the access point may designate a period used for direct communication within the configured direct communication period, and may transmit the trigger frame for initiating direct communication. In a downlink communication procedure and an uplink communication procedure, the trigger frame may be transmitted to the STA1. The trigger frame may be used to allocate the entire band to one terminal, the STA1, during the allowed direct communication period designated by the trigger frame within the configured direct communication period (e.g., TXOP).

In the uplink communication procedure, the STA1 may receive the trigger frame from the access point, and trigger data transmission operation(s) of the peer station(s) by transmitting the trigger frame to the peer station(s) after a SIFS from a reception time of the trigger frame. The STA1 may receive data frame(s) from the peer station(s), and may inform reception state(s) of the data frame(s) by transmitting a multi-STA BA frame after a SIFS from a reception time of the data frame(s). As another method, the access point may trigger a transmission operation of a multi-STA BA frame of the STA1 by transmitting a trigger frame to the STA1 after a transmission time of the data frame(s) of the peer station(s).

In the downlink communication procedure, the STA1 may receive the trigger frame including resource allocation information from the access point. The STA1 may transmit data frame(s) (e.g., trigger frame including data) to the peer station(s) based on the resource allocation information included in the trigger frame. The peer station(s) may receive the data frame(s) from the STA1 and may transmit a BA frame for the data frame(s) to the STA1. The STA1 may receive the BA frame from the peer station(s).

Figure 11A:
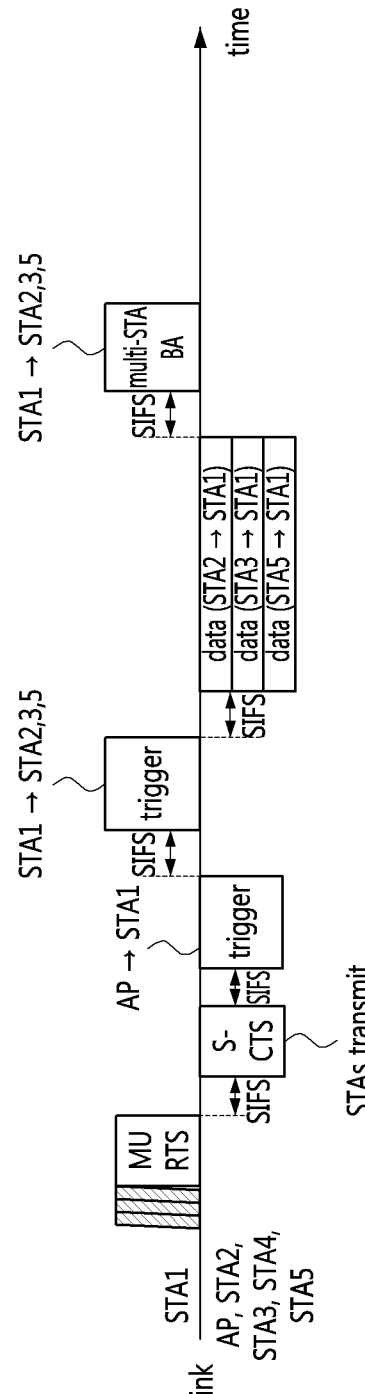
FIG. 11A is a conceptual diagram illustrating an eighth exemplary embodiment of a direct communication method in a wireless LAN system.
Figure 11B:
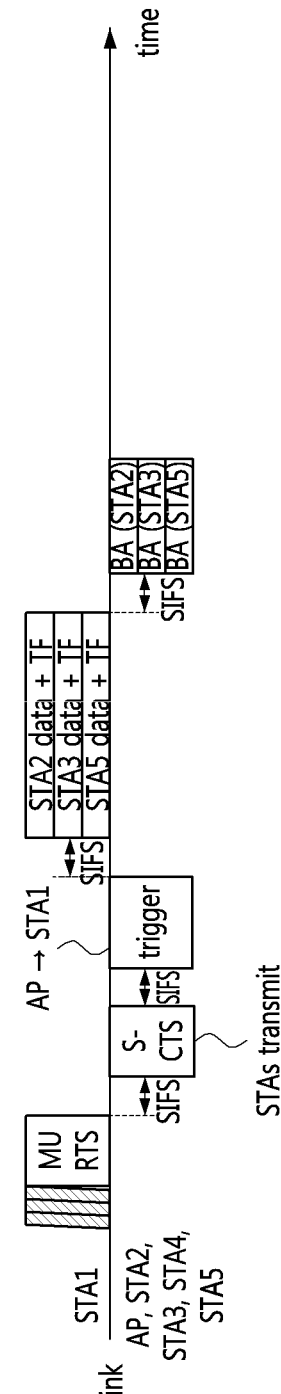
FIG. 11B is a conceptual diagram illustrating a ninth exemplary embodiment of a direct communication method in a wireless LAN system.

FIG. 11A is a conceptual diagram illustrating an eighth exemplary embodiment of a direct communication method in a wireless LAN system, and FIG. 11B is a conceptual diagram illustrating a ninth exemplary embodiment of a direct communication method in a wireless LAN system.

As shown in FIGS. 11A and 11B, a direct communication method illustrated in FIGS. 11A and 11B may be applied to the wireless LAN system illustrated in FIG. 5. An access point (AP) may be the access point 510 illustrated in FIG. 5. The STA1 may be the station 521 illustrated in FIG. 5. The STA1 may be associated with the access point and may operate as a relay station. The STA2 may be the station 522 illustrated in FIG. 5, the STA3 may be the station 523 illustrated in FIG. 5, the STA4 may be the station 524 illustrated in FIG. 5, and the STA5 may be the station 525 illustrated in FIG. 5. One or more of the STA2 to STA5 may operate as peer station(s). A communication node (e.g., access point or station) may perform a multi-link operation and may have a different MAC address for each link.

In order to initiate a direct communication procedure, the STA1 (e.g., relay station) may transmit an MU RTS frame including information indicating that direct communication is to be performed. The MU RTS frame may be transmitted in a link in which direct communication is to be performed. A reception target of the MU RTS frame may be a station (e.g., peer station) performing direct communication. An RA field of the MU RTS frame may be set to a broadcast address or a multicast address of peer stations.

The stations may receive the MU RTS frame from the STA1. A station (e.g., peer station) participating in direct communication among the stations receiving the MU RTS frame may transmit an S-CTS frame at a preset time. Here, the S-CTS frame may be a CTS frame simultaneously transmitted by each of the stations participating in direct communication. The S-CTS frame may include one or more parameters included in the MU-RTS received by the stations. The access point may receive the S-CTS frame by performing a monitoring operation on the link. That is, the access point may overhear the S-CTS frame. When the S-CTS frame is received, the access point may determine that there is a peer station(s) participating in direct communication. The access point may transmit a trigger frame to the STA1 after a SIFS from a reception time of the S-CTS frame. The trigger frame may include resource allocation information for a transmission operation. The trigger frame for initiating direct communication may be used to allocate resources only to one terminal, the STA1 (e.g., relay station) that is a target of direct communication. In addition, the trigger frame may include information indicating that direct communication is allowed and/or information (e.g., station identifiers) of peer stations participating in direct communication.

The STA1 may receive the trigger frame from the access point and may identify information included in the trigger frame. The resource allocation information included in the trigger frame may indicate a band and a time resource allocated to the STA1. The STA1 may identify a direct communication period based on the resource allocation information included in the trigger frame, and may perform uplink direct communication and/or downlink direct communication in the direct communication period.

As shown in FIG. 11A, in the uplink direct communication procedure, the STA1 may receive the trigger frame from the access point, and transmit a trigger frame after a SIFS from a reception time of the trigger frame, thereby triggering data transmission operation(s) of the peer station(s). The STA1 may receive data frame(s) from the peer station(s), and may inform reception state(s) of the data frame(s) by transmitting a multi-STA BA frame after a SIFS from a reception time of the data frame(s).

As shown in FIG. 11B, in the downlink direct communication procedure, the STA1 may transmit data to the peer stations. In this case, the STA1 may configure a trigger frame together with data in form of an A-MPDU, and may transmit an A-MPDU including the data and triggering information to the peer stations. The peer station may receive the data frame and the trigger frame from the STA1, and may identify a transmission resource of a BA frame that is a response to the data included in the received trigger frame. The peer station(s) may transmit a BA frame to the STA1 in response to the data using resource allocation information included in the trigger frame.

The access point may identify a value of a duration field included in a MAC header of the MU RTS frame received from the STA1 (e.g., TXOP requested by the STA1). The access point may set a value of a duration field included in a MAC header of the trigger frame to a direct communication period allowed by the access point. The allowed direct communication period may be a period within a TXOP initially configured by the STA1. When the access point wants to allocate a period smaller than a period requested by the first RTS frame of the STA1, the access point may set the value of the duration field included in the MAC header of the trigger frame to a value smaller than the requested period, and transmit the trigger frame including the corresponding duration value. The value of the duration field included in the MAC header of the trigger frame may indicate a period until an end time of the BA frame. When direct communication is not allowed, the access point may not transmit the trigger frame (e.g., trigger frame indicating the direct communication period allowed by the access point). If the trigger frame is not received from the access point, the STA1 may determine that direct communication is rejected.

Figure 12:
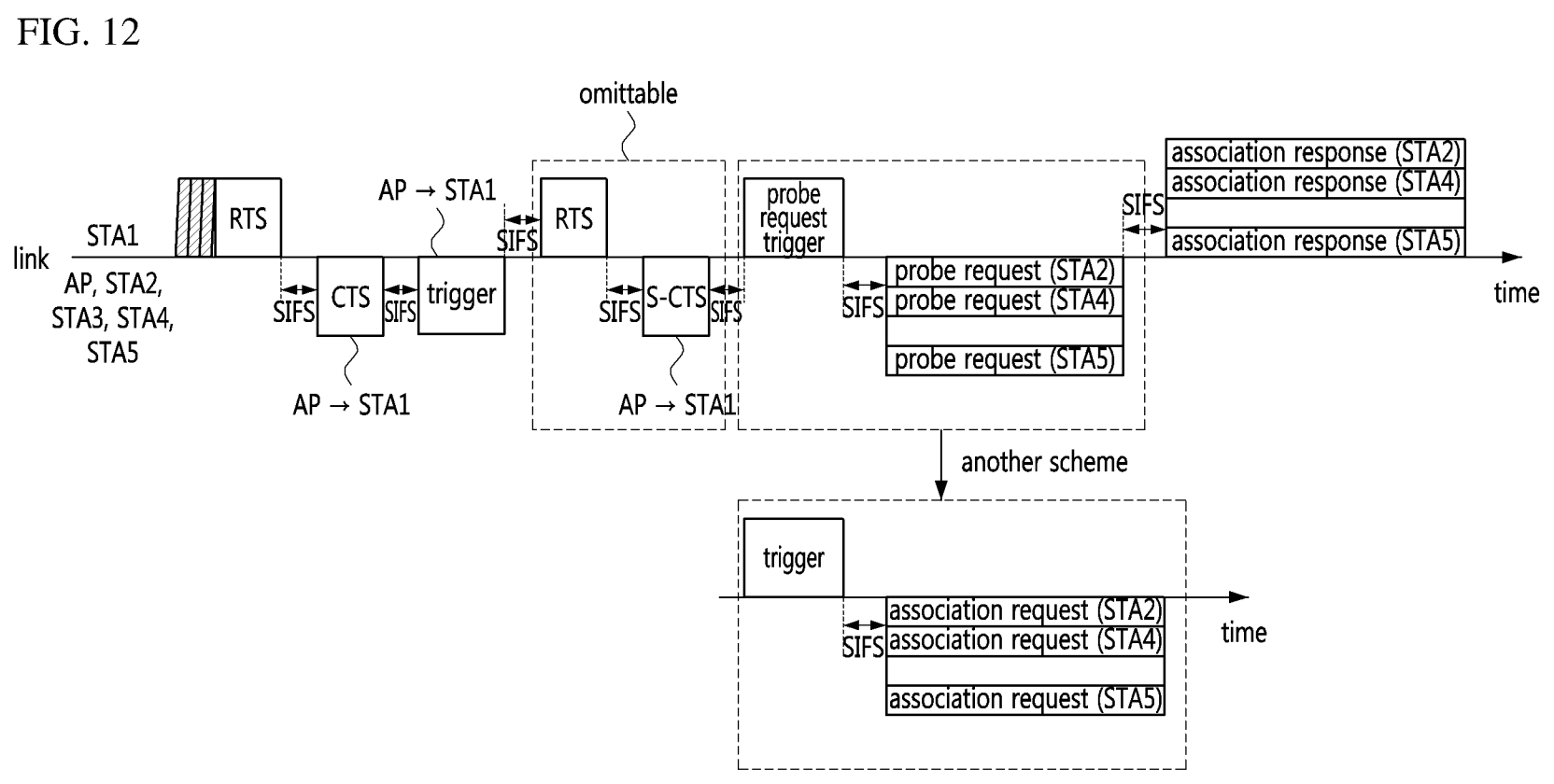

FIG. 12 is a conceptual diagram illustrating a tenth exemplary embodiment of a direct communication method in a wireless LAN system.

As shown in FIG. 12, a direct communication method illustrated in FIG. 12 may be applied to the wireless LAN system illustrated in FIG. 5. An access point (AP) may be the access point 510 illustrated in FIG. 5. The STA1 may be the station 521 illustrated in FIG. 5. The STA1 may be associated with the access point and may operate as a relay station. The STA2 may be the station 522 illustrated in FIG. 5, the STA3 may be the station 523 illustrated in FIG. 5, the STA4 may be the station 524 illustrated in FIG. 5, and the STA5 may be the station 525 illustrated in FIG. 5. One or more of the STA2 to STA5 may operate as peer station(s). A communication node (e.g., access point or station) may perform a multi-link operation and may have a different MAC address for each link.

The STA1 (e.g., relay station) may initiate a discovery procedure of peer station(s) by transmitting an RTS frame. The RTS frame may include information indicating that it is an RTS frame for direct communication. For example, an address field (e.g., RA field and/or TA field) of the RTS frame may be set to an address of the STA1 (e.g., a MAC address of the STA1 in the second link). The address field of the RTS frame may be used to indicate that direct communication is to be performed.

The access point may receive the RTS frame from the STA1 and may identify that direct communication is requested in the second link based on the RTS frame. When direct communication is allowed, the access point may transmit a CTS frame to the STA1 after a SIFS from a reception time of the RTS frame. The access point may generate a trigger frame including resource allocation information for direct communication, and may transmit the trigger frame to the STA1. In order to support the above-described operation, a value of a duration field included in the RTS frame may indicate a TXOP1. The TXOP1 may include (SIFS+transmission time of the CTS frame+SIFS+transmission time of the trigger frame). The TXOP1 may be a time required for direct communication preparation.

In the direct communication procedure, a value of a duration field of a frame transmitted and received between the STA1 and stations may indicate an extended TXOP2. The TXOP2 may be a time required for direct communication.

The STA1 may perform a discovery procedure of peer station(s) for direct communication after a SIFS from a reception time of the trigger frame. In the peer station discovery procedure, the STA1 may transmit an RTS frame, and station(s) participating in direct communication among stations receiving the RTS frame may transmit an S-CTS frame to the STA1. Here, the S-CTS frame may be a CTS frame simultaneously transmitted by each of the stations participating in direct communication. The S-CTS frame may include one or more parameters included in the MU-RTS frame received by the stations. A peer station discovered in the peer station discovery procedure may be a station not associated with the access point. Peer stations not associated with the access point may simultaneously transmit the CTS frame at a preset time. The direct communication period configured by the RTS-S-CTS transmission/reception procedure may be the TXOP2.

The transmission/reception of the CTS frame may mean that there is a station(s) that wants to participate in direct communication among stations not associated with the access point. An association procedure for the corresponding station (e.g., peer station) may be performed. If there is no station to participate in direct communication among the stations not associated with the access point, the CTS frame may not be transmitted. If the CTS frame is not received, the STA1 or the access point may terminate the TXOP (e.g., extended TXOP2) by transmitting a CF-END frame or a null frame. The RTS-S-CTS operation for discovering peer station(s) may be omitted.

When the CTS frame is received, the STA1 may transmit a trigger frame (e.g., trigger frame corresponding to a probe request frame) after a SIFS from a reception time of the CTS frame. The trigger frame may be referred to as a 'probe request trigger frame'. The probe request trigger frame may request transmission of a probe response frame from a station not associated with the access point. The probe request trigger frame may include system parameters (e.g., modulation and coding scheme (MCS) information) required for communication. The station(s) receiving the probe request trigger frame may transmit a probe response frame through contention. The probe response frame may include system parameters of the corresponding station (e.g., station participating in direct communication). An association request frame may be transmitted instead of the probe response frame.

The STA1 may receive the probe response frame and transmit an association response frame in response to the probe response frame. The peer station may receive the association response frame from the STA1. When the association procedure of the peer station is completed, direct communication between the relay station and the peer station may be performed.

The exemplary embodiments of the present disclosure may be implemented as program instructions executable by a variety of computers and recorded on a computer-readable medium. The computer-readable medium may include a program instruction, a data file, a data structure, or a combination thereof. The program instructions recorded on the computer-readable medium may be designed and configured specifically for the present disclosure or can be publicly known and available to those who are skilled in the field of computer software.

Examples of the computer-readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. An operation method of a first station in a wireless local area network (LAN), the operation method comprising:
transmitting, to an access point, a first frame for performing a communication between the first station and a second station;

receiving, from the access point, a second frame that is a response to the first frame; and
in response to receiving the second frame, performing the communication with the second station in a communication channel,
wherein the first frame includes information indicating a period in which the communication is performed, and another station which is not participating in the communication does not transmit to the first station during the period.

2. The operation method according to claim 1, wherein the performing of the communication comprises:
transmitting a third frame to initiate the communication with the second station in the communication channel;
receiving, from the second station, a fourth frame in response to the third frame in the communication channel; and
transmitting or receiving data frame(s) to or from the second station in the communication channel.

3. The operation method according to claim 2, further comprising transmitting, to the second station, a fifth frame including resource allocation information in the communication channel, wherein the data frame(s) is transmitted or received using resource(s) indicated by the resource allocation information.

4. The operation method according to claim 2, wherein the data frame(s) is transmitted or received in an Orthogonal Frequency Division Multiple Access (OFDMA) scheme.

5. The operation method according to claim 1, wherein a receiver address (RA) field of the first frame is set to the information indicating the communication channel instead of an address of the access point.

6. The operation method according to claim 1, wherein the first frame is a request-to-send (RTS) frame or a multi user (MU) RTS frame, and the second frame is a clear-to-send (CTS) frame or a simultaneous(S)-CTS frame.

7. The operation method according to claim 1, wherein the second frame is received from the access point when the communication is allowed.

8. The operation method according to claim 1, wherein the first frame further includes information indicating the communication channel in which the communication is performed.

9. A first station, comprising:
a processor;
a memory electronically communicating with the processor; and
instructions stored in the memory,
wherein when executed by the processor, the instructions cause the first station to:
transmit, to an access point, a first frame for performing a communication between the first station and a second station;
receive, from the access point, a second frame that is a response to the first frame; and
in response to receiving the second frame, perform the communication with the second station in a communication channel,
wherein the first frame includes information indicating a period in which the communication is performed, and another station which is not participating in the communication does not transmit to the first station during the period.

10. The first station according to claim 9, wherein in the performing of the communication, the instructions further cause the first station to:

transmit a third frame to initiate the communication with the second station in the communication channel;

receive, from the second station, a fourth frame in response to the third frame in the communication channel; and transmit or receive data frame(s) to or from the second station in the communication channel.

11. The first station according to claim 10, wherein the instructions further cause the first station to transmit, to the second station, a fifth frame including resource allocation information in the communication channel, wherein the data frame(s) is transmitted or received using resource(s) indicated by the resource allocation information.

12. The first station according to claim 9, wherein a receiver address (RA) field of the first frame is set to the information indicating the communication channel instead of an address of the access point.

13. The first station according to claim 9, wherein the first frame further includes information indicating the communication channel in which the communication is performed.

\*  \*  \*  \*  \*